(12) United States Patent
Mayer et al.

(10) Patent No.: US 6,565,770 B1
(45) Date of Patent: *May 20, 2003

(54) COLOR-SHIFTING PIGMENTS AND FOILS WITH LUMINESCENT COATINGS

(75) Inventors: Thomas Mayer, Santa Rosa, CA (US); Stacey A. Yamanaka, Windsor, CA (US); Jaroslaw Zieba, Santa Rosa, CA (US)

(73) Assignee: Flex Products, Inc., Santa Rosa, CA (US)

( * ) Notice: Subject to any disclaimer, the term of this patent is extended or adjusted under 35 U.S.C. 154(b) by 27 days.

This patent is subject to a terminal disclaimer.

(21) Appl. No.: 09/715,934

(22) Filed: Nov. 17, 2000

(51) Int. Cl.[7] ........................... C09K 11/02; C09K 11/00
(52) U.S. Cl. ........... 252/301.36; 252/700; 252/301.4 R; 252/301.4 S; 252/301.4 F; 252/301.4 H; 252/301.4 P; 252/301.5; 252/301.6 R; 252/301.6 S; 252/301.6 F; 252/301.6 P; 428/690; 106/403; 106/404; 106/415; 106/417; 427/157; 427/201; 427/202; 427/204; 427/205; 427/214; 427/215; 427/218; 427/219; 427/220
(58) Field of Search ................................. 106/403, 404, 106/415, 417; 252/301.36, 700, 301.4 R, 301.4 S, 301.4 P, 301.4 F, 301.4 H, 301.6 R, 301.6 S, 301.6 P, 301.6 F, 301.5; 428/690, 403, 407; 427/157, 202, 201, 204, 205, 214, 215, 218, 219, 220

(56) References Cited

U.S. PATENT DOCUMENTS

| | | | |
|---|---|---|---|
| 3,011,383 A | 12/1961 | Sylvester et al. | 88/1 |
| 3,374,105 A | 3/1968 | Bolomey | 106/291 |
| 3,858,977 A | 1/1975 | Baird et al. | 356/71 |
| 4,081,763 A | 3/1978 | Vlasenko et al. | 331/94.5 |
| 4,168,983 A | 9/1979 | Vittands et al. | 106/14.12 |
| 4,173,002 A | 10/1979 | Fine et al. | 331/94.5 |
| 4,309,075 A | 1/1982 | Apfel et al. | 350/164 |

(List continued on next page.)

FOREIGN PATENT DOCUMENTS

| | | |
|---|---|---|
| DE | 19941253 | 8/1999 |
| EP | 353544 | 7/1990 |

(List continued on next page.)

OTHER PUBLICATIONS

Quantum Dot Corporation—Technology, http://www.qdots.com/technology.html, Oct. 26, 2000.

(List continued on next page.)

*Primary Examiner*—C. Melissa Koslow
(74) *Attorney, Agent, or Firm*—Workman Nydegger Seeley

(57) ABSTRACT

Interference pigment flakes and foils are provided which have luminescent and color-shifting properties. A luminescent material coating structure is provided which partially covers or encapsulates a color-shifting pigment flake, or covers the outer surface of a foil. The pigment flakes can have a symmetrical coating structure on opposing sides of a core layer, can have an asymmetrical coating structure with all of the layers on one side of the core layer, or can be formed with encapsulating coatings around the core layer. The coating structure of the flakes and foils includes a core layer, a dielectric layer overlying the core layer, and an absorber layer overlying the dielectric layer. The luminescent pigment flakes and foils exhibit a discrete color shift so as to have a first color at a first angle of incident light or viewing and a second color different from the first color at a second angle of incident light or viewing. The luminescent pigment flakes can be interspersed into liquid media such as paints or inks to produce colorant materials for subsequent application to objects or papers. The luminescent foils can be laminated to various objects or can be formed on a carrier substrate.

84 Claims, 6 Drawing Sheets

U.S. PATENT DOCUMENTS

| | | | |
|---|---|---|---|
| 4,434,010 A | 2/1984 | Ash | 106/291 |
| 4,552,593 A | 11/1985 | Ostertag | 106/291 |
| 4,705,300 A | 11/1987 | Berning et al. | 283/91 |
| 4,705,356 A | 11/1987 | Berning et al. | 350/166 |
| 4,721,217 A | 1/1988 | Phillips et al. | 215/230 |
| 4,756,771 A | 7/1988 | Brodalla et al. | 148/6.1 |
| 4,779,898 A | 10/1988 | Berning et al. | 283/58 |
| 4,838,648 A | 6/1989 | Phillips et al. | 350/166 |
| 4,930,866 A | 6/1990 | Berning et al. | 350/320 |
| 4,931,312 A | 6/1990 | de Leeuw et al. | 427/64 |
| 4,965,091 A | 10/1990 | Fratello et al. | 427/64 |
| 4,978,394 A | 12/1990 | Ostertag et al. | 106/404 |
| 4,995,043 A | 2/1991 | Kuwata et al. | 372/7 |
| 5,002,312 A | 3/1991 | Phillips et al. | 283/72 |
| 5,009,486 A | 4/1991 | Dobrowolski et al. | 350/164 |
| 5,059,245 A | 10/1991 | Phillips et al. | 106/22 |
| 5,084,351 A | 1/1992 | Philips et al. | 428/411.1 |
| 5,116,664 A | 5/1992 | Kimura et al. | 428/216 |
| 5,135,812 A | 8/1992 | Phillips et al. | 428/403 |
| 5,171,363 A | 12/1992 | Phillips et al. | 106/22 |
| 5,190,807 A | 3/1993 | Kimock et al. | 428/216 |
| 5,198,042 A | 3/1993 | Masumoto et al. | 148/403 |
| 5,214,530 A | 5/1993 | Coombs et al. | 359/359 |
| 5,222,092 A | 6/1993 | Hench et al. | 372/53 |
| 5,242,617 A | 9/1993 | Metzger et al. | 252/299.5 |
| 5,278,590 A | 1/1994 | Phillips et al. | 359/589 |
| 5,279,657 A | 1/1994 | Phillips et al. | 106/22 |
| 5,281,480 A | 1/1994 | Phillips et al. | 428/412 |
| 5,286,803 A | 2/1994 | Lindsay et al. | 525/329.7 |
| 5,329,540 A | 7/1994 | Lee et al. | 372/53 |
| 5,332,767 A | 7/1994 | Reisser et al. | 523/209 |
| 5,356,667 A | 10/1994 | Hench et al. | 427/384 |
| 5,362,315 A | 11/1994 | Müller-Rees et al. | 106/493 |
| 5,364,467 A | 11/1994 | Schmid et al. | 106/404 |
| 5,384,795 A | 1/1995 | Cho | 372/7 |
| 5,469,018 A | 11/1995 | Jacobsen et al. | 313/461 |
| 5,480,582 A | 1/1996 | Pope | 252/301.4 |
| 5,549,774 A | 8/1996 | Miekka et al. | 156/209 |
| 5,571,624 A | 11/1996 | Phillips et al. | 428/403 |
| 5,573,584 A | 11/1996 | Ostertag et al. | 106/417 |
| 5,607,504 A | 3/1997 | Schmid et al. | 106/403 |
| 5,616,986 A | 4/1997 | Jacobsen et al. | 313/461 |
| 5,624,076 A | 4/1997 | Miekka et al. | 241/3 |
| 5,624,486 A | 4/1997 | Schmid et al. | 106/404 |
| 5,629,068 A | 5/1997 | Miekka et al. | 428/148 |
| 5,648,165 A | 7/1997 | Phillips et al. | 428/346 |
| 5,672,410 A | 9/1997 | Miekka et al. | 428/148 |
| 5,683,622 A | 11/1997 | Krätzschmar et al. | 252/299.01 |
| 5,733,976 A | 3/1998 | Sailer | 525/100 |
| 5,763,086 A | 6/1998 | Schmid et al. | 428/404 |
| 5,766,335 A | 6/1998 | Bujard et al. | 106/404 |
| 5,770,299 A | 6/1998 | Dannenhauer et al. | 428/195 |
| 5,804,919 A | 9/1998 | Jacobsen et al. | 313/506 |
| 5,807,497 A | 9/1998 | Gailberger et al. | 252/299.01 |
| 5,824,733 A | 10/1998 | Döbert et al. | 524/506 |
| 5,851,277 A | 12/1998 | Müller-Rees et al. | 106/287.35 |
| 5,858,078 A | 1/1999 | Andes et al. | 106/437 |
| 5,877,895 A | 3/1999 | Shaw et al. | 359/588 |
| 5,888,444 A | 3/1999 | Dannenhauer et al. | 264/482 |
| 5,912,257 A | 6/1999 | Prasad et al. | 514/356 |
| 6,013,370 A | 1/2000 | Coulter et al. | 428/403 |
| 6,022,592 A | 2/2000 | Reisfeld et al. | 427/379 |
| 6,025,677 A | 2/2000 | Moss, III et al. | 313/503 |
| 6,150,022 A | 11/2000 | Coulter et al. | 428/403 |

FOREIGN PATENT DOCUMENTS

| | | |
|---|---|---|
| EP | 927749 | 7/1999 |
| EP | 927750 | 7/1999 |
| WO | WO 00/29617 | 5/2000 |
| WO | WO 00/31571 | 6/2000 |
| WO | WO 01/60924 * | 8/2001 |

OTHER PUBLICATIONS

Kirk–Othmer, "*Concise Encyclopedia of Chemical Technology*," pp. 710–713, 1985.

John M. McKieman, et al., "*Luminescence and Laser Action of Coumarin Dyes Doped in Silicate and Aluminosilicate Glasses Prepared by the Sol–Gel Technique*," Journal of Inorganic and Organometallic Polymers, vol. 1, No. 1, 87–103, 1991.

Jeffrey I. Zink, et al., "*Optical Probes and Properties of Aluminosilicate Glasses Prepared by the Sol–Gel Method*," Polymer Material Science and Engineering, 61, 204–208, 1989.

J.A. Dobrowolski, K.M. Baird, P.D. Carman and A. Waldorf, "*Optical Interference Coatings for Inhibiting of Counterfeiting*," Optica Acta, 1973, vol. 20, No. 12, pp. 925–937.

* cited by examiner

COLOR-SHIFTING PIGMENTS AND FOILS WITH LUMINESCENT COATINGS

BACKGROUND OF THE INVENTION

1. Field of the Invention

The present invention relates generally to optical effect pigments and foils. More particularly, the present invention relates to optically variable pigment flakes and foils with luminescent coatings.

2. Background Technology

Various color-shifting pigments, colorants, and foils have been developed for a wide variety of applications. For example, color-shifting pigments have been used in applications such as cosmetics, inks, coating materials, ornaments, ceramics, automobile paints, anti-counterfeiting hot stamps and anti-counterfeiting inks for security documents and currency. Such pigments, colorants, and foils exhibit the property of changing color upon variation of the angle of incident light, or as the viewing angle of the observer is shifted.

The color-shifting properties of the pigments and foils can be controlled through proper design of the optical thin films or orientation of the molecular species used to form the flake or foil coating structure. Desired effects can be achieved through the variation of parameters such as thickness of the layers forming the flakes and foils and the index of refraction of each layer. The changes in perceived color which occur for different viewing angles or angles of incident light are a result of a combination of selective absorption of the materials comprising the layers and wavelength dependent interference effects. The interference effects, which arise from the superposition of light waves that have undergone multiple reflections, are responsible for the shifts in color perceived with different angles. The reflection maxima changes in position and intensity, as the viewing angle changes, due to the absorption characteristics of a material which are selectively enhanced at particular wavelengths from the interference phenomena.

Various approaches have been used to achieve such color-shifting effects. For example, small multilayer flakes, typically composed of multiple layers of thin films, are dispersed throughout a medium such as paint or ink that may then be subsequently applied to the surface of an object. Such flakes may optionally be overcoated to achieve desired colors and optical effects. Another approach is to encapsulate small metallic or silicatic substrates with varying layers and then disperse the encapsulated substrates throughout a medium such as paint or ink. Additionally, foils composed of multiple layers of thin films on a substrate material have been made.

One manner of producing a multilayer thin film structure is by forming it on a flexible web material with a release layer thereon. The various layers are deposited on the web by methods well known in the art of forming thin coating structures, such as PVD, sputtering, or the like. The multilayer thin film structure is then removed from the web material as thin film color-shifting flakes, which can be added to a polymeric medium such as various pigment vehicles for use as an ink or paint. In addition to the color-shifting flakes, additives can be added to the inks or paints to obtain desired color-shifting results.

Color-shifting pigments or foils are formed from a multilayer thin film structure that includes the same basic layers. These include an absorber layer(s), a dielectric layer(s), and optionally a reflector layer, in varying layer orders. The coatings can be formed to have a symmetrical multilayer thin film structure, such as:

absorber/dielectric/reflector/dielectric/absorber; or
absorber/dielectric/absorber.

Coatings can also be formed to have an asymmetrical multilayer thin film structure, such as:

absorber/dielectric/reflector.

For example, U.S. Pat. No. 5,135,812 to Phillips et al., which is incorporated by reference herein, discloses color-shifting thin film flakes having several different configurations of layers such as transparent dielectric and semi-transparent metallic layered stacks. In U.S. Pat. No. 5,278,590 to Phillips et al., which is incorporated by reference herein, a symmetric three layer optical interference coating is disclosed which comprises first and second partially transmitting absorber layers which have essentially the same material and thickness, and a dielectric spacer layer located between the first and second absorber layers.

Color-shifting platelets for use in paints are disclosed in U.S. Pat. No. 5,571,624 to Phillips et al., which is incorporated by reference herein. These platelets are formed from a symmetrical multilayer thin film structure in which a first semi-opaque layer such as chromium is formed on a substrate, with a first dielectric layer formed on the first semi-opaque layer. An opaque reflecting metal layer such as aluminum is formed on the first dielectric layer, followed by a second dielectric layer of the same material and thickness as the first dielectric layer. A second semi-opaque layer of the same material and thickness as the first semi-opaque layer is formed on the second dielectric layer.

As discussed above, there are a wide variety of thin film devices produced today, including many that are used as security devices. Although color-shifting pigments and foils provide properties that make them extremely useful as components of security devices, it is desirable to seek additional levels of security by adding additional features.

In European patent application publication EP 0927749A1 to Bleikolm et al. (hereafter "Bleikolm") multilayered thin films for security and anti-counterfeiting uses are disclosed. Two or more thin layers are deposited in a film, which is subsequently ground into thin film particles. These particles can be mixed into a coating material or incorporated into a bulk material and are optionally luminescent. Both the sequence of layers and their thicknesses can be used to analyze and identify the particles. Bleikolm further discloses the use of the multilayer thin film structure as a tag. Further, the thin film particles can be used in a mixture with color-shifting pigments to provide an ink with increased properties. Nevertheless, the thin film particles do not themselves have color-shifting properties.

European Patent Application Publication EP 0927750A1 to Rozumek et al. (hereafter "Rozumek") discloses the use of two distinct inorganic chemicals incorporated into particles in a predefined and analytical ratio. The particles can be mixed into a coating material or incorporated into a bulk material. The particles provide both spatial and chemical information for security and anti-counterfeiting applications based on the material of the particles and their physical location in an ink as applied to a surface. In one embodiment, one or both of the particles are luminescent.

Unfortunately, the performance of prior color-shifting/luminescent inks has several drawbacks. For example, when color-shifting flakes are combined with luminescent particles, separation tends to occur. The color-shifting flakes and luminescent particles also tend to be incompatible with the same ink or coating vehicle, making them difficult to use together. Further, the luminescent particles tend to opacify and dull the color performance of the color-shifting flakes.

Additionally, the simple physical mixing of separate color-shifting and luminescent species does not allow for control of the re-emitted spectrum at differing angles since there is no way to control the optical path within simple physical mixtures. Finally, in the current state of the art, forming a thin film interference coating structure that employs a luminescent material as the dielectric is impractical because the stoichiometry of inorganic luminescent materials is very important and their production usually requires processing at temperatures higher than standard coating temperatures.

Accordingly, there is a need for improved coating structures and methods that avoid the above difficulties in forming luminescent color-shifting compositions.

SUMMARY AND OBJECTS OF THE INVENTION

It is an object of the present invention to provide pigments and foils for use in or as security devices that have both overt and covert features.

It is another object of the invention to provide new features for optical effect pigments and foils that increase their value for use in or as security devices.

It is a further object of the invention to provide luminescent color-shifting pigment compositions that avoid separation into discrete components.

It is another object of the invention to provide a luminescent color-shifting pigment, wherein the pigment's luster is not diminished by the presence of the luminescent material.

To achieve the forgoing objects and in accordance with the invention as embodied and broadly described herein, interference pigment flakes and foils are provided that have luminescent and color-shifting properties. A luminescent material coating structure is provided which partially covers or encapsulates a color-shifting pigment flake, or partially or completely covers the outer surface of a foil.

The luminescent pigment flakes can assume a variety of useful configurations. For example, a flake may have a symmetrical coating structure on opposing sides of a core layer, or an asymmetrical coating structure with all of the layers on one side of the core layer, or can be formed with encapsulating coatings around the core layer, or other configurations. The coating structure of the flakes and foils generally includes a core layer such as a reflector layer or transparent particle, a dielectric layer overlying the core layer, and an absorber layer overlying the dielectric layer.

The multilayer flakes are encapsulated by a luminescent coating layer that includes a luminescent material such as a fluorescent material, a phosphorescent material, an electroluminescent material, a chemoluminescent material, a triboluminescent material, or other like materials. Such luminescent materials exhibit a characteristic emission of electromagnetic energy in response to an energy source generally without any substantial rise in temperature.

The luminescent pigment flakes and foils exhibit a discrete color shift so as to have a first color at a first angle of incident light or viewing and a second color different from the first color at a second angle of incident light or viewing. The pigment flakes can be interspersed into liquid media such as paints or inks to produce colorant materials for subsequent application to objects or papers. Another embodiment of the invention comprises a mixture of one type of luminescent color-shifting flakes with another type of luminescent and/or non-luminescent color-shifting flakes in a predetermined ratio. The foils can be laminated to various objects or can be formed on a carrier substrate.

The foregoing objects and features of the present invention will become more fully apparent from the following description and appended claims, or may be learned by the practice of the invention as set forth hereinafter.

BRIEF DESCRIPTION OF THE DRAWINGS

In order to illustrate the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE INVENTION

Figure 1:
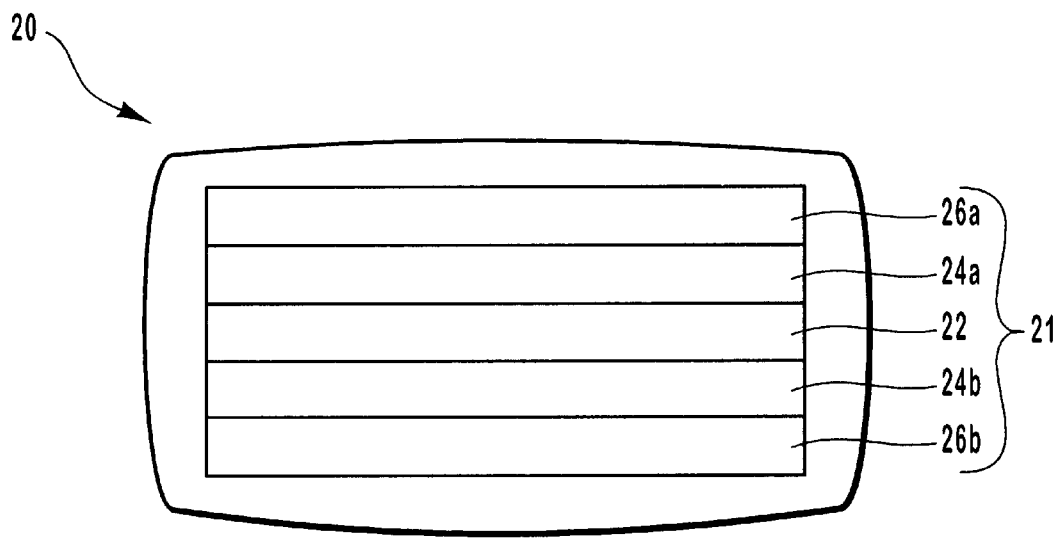
FIG. 1 is a schematic representation of a luminescent color-shifting structure according to the invention.

The present invention is directed generally to luminescent optical effect pigment flakes and foils, as well as methods of making the same. The pigment flakes and foils have substantial shifts in chroma and hue with changes in angle of incident light or viewing angle of an observer. Such an optical effect, sometimes known as color shift, optical variability, or goniochromaticity, allows a perceived color to vary with the angle of illumination or observation.

Accordingly, the pigment flakes and foils exhibit a first color at a first angle of incident light or viewing and a second color different from the first color at a second angle of incident light or viewing.

A luminescent optical effect pigment composition of the invention includes a plurality of optical effect pigment flakes having a first surface and a second surface opposite the first surface, and a luminescent coating layer on at least one of the first or second surfaces of the pigment flakes. The optical effect pigment flakes can be selected from multilayer optical interference pigments, solid pigments comprising one or more solidified polymeric liquid crystal components, microdiffractive pigments, interference mica, coated interference mica, and other interference components.

Generally, the luminescent color-shifting pigment flakes of the invention which have a multilayer flake structure can have a symmetrical coating structure on opposing sides of a core layer, can have an asymmetrical coating structure with all of the layers on one side of the core layer, or can be formed with encapsulating coatings which surround a core layer. The coating structure of the flakes and foils generally includes a core layer, a dielectric layer overlying the core layer, and an absorber layer overlying the dielectric layer. Each of these layers in the coating structures of the flakes and foils of the invention will be discussed in further detail hereinafter. A luminescent material is used to form an outer luminescent coating layer on the flake or foil structure once the basic flake or foil structure has been fabricated. The outer luminescent coating layer can be partially or completely composed of a luminescent material. The luminescent pigment flakes can be interspersed into liquid media such as paints or inks to produce various color-shifting colorant compositions for subsequent application to objects or papers. The luminescent foils can be laminated to various objects or can be formed on a carrier substrate.

As used herein, the term "luminescent material" refers to any atomic or molecular species or solid-state compound that converts at least part of incident energy into emitted electromagnetic radiation with a characteristic signature. Nonlimiting examples include luminescent materials that exhibit fluorescence, phosphorescence, and the like. These materials can be used in forming the outer luminescent coating layer on the flake or foil structure. The luminescent material can be employed in solid solution form in the outer luminescent coating layer, or can be a solid phase such as a crystalline phosphor material.

The function of the luminescent material is to impart optical stimuli responsive characteristics to the pigment flakes and foils. For example, when the pigment flakes or foils are illuminated with electromagnetic radiation, bombarded with ionizing particles or radiation, or exposed to other excitation energy sources, the flakes or foils emit ultraviolet, visible or infrared radiation of a characteristic wavelength associated with the luminescent material species, or the optical interference characteristics of the flake. Numerous types of luminescent material species are known to one having ordinary skill in the art of photochemistry and physics, and may produce emission of light through any of the emission processes, such as single-photon emission, multiple photon emission, and the like. Examples of suitable luminescent materials for use in the present invention are described in further detail hereafter.

The non-luminescent layers in the color-shifting flakes and foils of the invention can be formed using conventional thin film deposition techniques, which are well known in the art of forming thin film coating structures. Nonlimiting examples of such thin film deposition techniques include physical vapor deposition (PVD), chemical vapor deposition (CVD), plasma enhanced (PE) variations thereof such as PECVD or downstream PECVD, sputtering, electrolysis deposition, and other deposition methods capable of forming discrete and uniform thin film layers. The luminescent coating layer can be applied to the preformed flake or foil structures by a variety of novel coating methods which are discussed in further detail hereafter.

The present inventors have discovered that color-shifting pigments and foils coated with a luminescent layer, which is either completely or partially comprised of a luminescent material, produce surprising results. For example, it is an unexpected result of the invention that the addition of certain luminescent materials to color-shifting pigments does not degrade the performance of the color-shifting pigments. Rather, luminescence becomes a secondary feature of the pigments that functions independently of the color shift. In addition, the luminescence yield is surprisingly much higher for color-shifting pigment flakes coated with a luminescent material than for mixtures of color-shifting pigment flakes and fluorescent particles. This is due to a higher percentage of luminescence surface area in the coated pigment flakes than in the mixture of color-shifting pigments and luminescent particles.

In fact, the very nature of the luminescence effect is unexpected. This is in part because of the discovery that the luminescence intensity varies with the angle of incident light and is independent of the viewing angle. Color shift, in contrast, occurs with a change in viewing angle as well as incident angle. Another surprising result occurs when the luminescent layer coating thickness allows for a high percentage of excitation wavelength light to pass through to the color-shifting layer structure of a pigment flake or foil. The excitation light is reflected from the color-shifting layer structure back into the luminescent layer allowing the luminescent layer to absorb more energy and thereby increase the luminescence yield. This phenomenon is manifested as a change in luminescence intensity with angle of excitation light, since the reflected excitation light is subject to the same incident angle dependency rules as visible light. Surprisingly, there is little dependency of observed luminescence intensity on observation angle.

Another novel feature of the present invention is the ease of handling and reliability of the luminescent color-shifting pigments. Conventional mixtures of color-shifting pigments and luminescent particles result in mixtures with a tendency to separate into individual components. Thus, the presence of the luminescent material is more easily detectable and it is more difficult to ensure consistent dispersions. The present invention overcomes these problems because the luminescent material cannot separate from the pigment flakes, ensuring uniform compositions. In addition, when luminescent dyes are applied as a coating on the color-shifting pigment flakes, there is no deleterious effect on the ability of the color-shifting pigment flakes to be substantially planar when set.

Advantageously, the combined luminescent coating and interference layers also make a structural analysis of the pigment flakes more difficult for potential counterfeiters. While the luminescent effects are detectable, the structure that creates the luminescent effects cannot be observed by microscopic techniques. It is thus more difficult to analyze and emulate the pigment flakes. In contrast, mixtures of luminescent particles and color-shifting pigments can be readily studied under a microscope to isolate and identify the luminescent particles.

In one embodiment of the present invention, the luminescent layer emits electromagnetic radiation when illuminated with electromagnetic energy containing the excitation wavelengths of the luminescent material. The emission of electromagnetic radiation from the color-shifting pigment or foil is a function of the luminescent layer's composition and concentration, the incident energy, the overall design of the thin film stack in the flake or foil, the angle of incidence, and the wavelength-dependant electric field intensity reaching the luminescent layer.

Referring now to the drawings, wherein like structures are provided with like reference designations, the drawings only show the structures necessary to understand the present invention. FIG. 1 is a schematic depiction of a luminescent color-shifting pigment flake 20 according to one embodiment of the invention. The flake 20 is an encapsulated stack design composed of a multilayer core 21 having a generally symmetrical thin film structure on opposing sides of a reflector layer 22. Thus, first and second dielectric layers 24a and 24b are disposed respectively on opposing sides of reflector layer 22, and first and second absorber layers 26a and 26b are disposed respectively on each of dielectric layers 24a and 24b. A luminescent coating layer 28 is shown to substantially surround multilayer core 21. Alternatively, luminescent coating layer 28 can be formed so as to partially cover core 21. Each of these layers in the coating structure of flake 20 is discussed below in greater detail. Although not illustrated, the flake 20 can also contain further optical coatings.

The reflector layer 22 of flake 20 can be composed of various materials. Presently preferred materials are one or more metals, one or more metal alloys, or combinations thereof, because of their high reflectivity and ease of use, although non-metallic reflective materials could also be used. Nonlimiting examples of suitable metallic materials for the reflector layer include aluminum, silver, copper, gold, platinum, tin, titanium, palladium, nickel, cobalt, rhodium, niobium, chromium, and combinations or alloys thereof. These can be selected based on the color effects desired. The reflector layer can be formed to have a suitable physical thickness of from about 200 angstroms (Å) to about 10,000 Å, and preferably from about 400 Å to about 700 Å.

The dielectric layers 24a and 24b act as spacers in the thin film stack structure of flake 20. The dielectric layers are formed to have an effective optical thickness for imparting interference color and desired color-shifting properties. The dielectric layers may be optionally clear, or may be selectively absorbing so as to contribute to the color effect of a pigment. The optical thickness is a well known optical parameter defined as the product $\eta d$, where $\eta$ is the refractive index of the layer and d is the physical thickness of the layer. Typically, the optical thickness of a layer is expressed in terms of a quarter wave optical thickness (QWOT) that is equal to $4\eta d/\lambda$, where $\lambda$ is the wavelength at which a QWOT condition occurs. The optical thickness of dielectric layers can range from about 2 QWOT at a design wavelength of about 400 nm to about 9 QWOT at a design wavelength of about 700 nm, and preferably 2–6 QWOT at 400–700 nm, depending upon the color shift desired. The dielectric layers typically have a physical thickness of about 100 nm to about 800 nm.

Suitable materials for dielectric layers include those having a "high" index of refraction, defined herein as greater than about 1.65, as well as those have a "low" index of refraction, which is defined herein as about 1.65 or less. Each of the dielectric layers can be formed of a single material or with a variety of material combinations and configurations. For example, the dielectric layers can be formed of only a low index material or only a high index material, a mixture or multiple sublayers of two or more low index materials, a mixture or multiple sublayers of two or more high index materials, or a mixture or multiple sublayers of low index and high index materials. In addition, the dielectric layers can be formed partially or entirely of high/low dielectric optical stacks, which are discussed in further detail below. When a dielectric layer is formed partially with a dielectric optical stack, the remaining portion of the dielectric layer can be formed with a single material or various material combinations and configurations as described above.

Examples of suitable high refractive index materials for the dielectric layer include zinc sulfide (ZnS), zinc oxide (ZnO), zirconium oxide ($ZrO_2$), titanium dioxide ($TiO_2$), carbon (C), indium oxide ($In_2O_3$), indium-tin-oxide (ITO), tantalum pentoxide (Ta2O5), ceric oxide ($CeO_2$), yttrium oxide ($Y_2O_3$), europium oxide ($Eu_2O_3$), iron oxides such as (II)diiron(III) oxide ($Fe_3O_4$) and ferric oxide ($Fe_2O_3$), hafnium nitride (HfN), hafnium carbide (HfC), hafnium oxide ($HfO_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon carbide (SiC), silicon nitride ($Si_3N_4$), silicon monoxide (SiO), selenium trioxide ($Se_2O_3$), tin oxide ($SnO_2$), tungsten trioxide ($WO_3$), combinations thereof, and the like.

Suitable low refractive index materials for the dielectric layer include silicon dioxide ($SiO_2$), aluminum oxide ($Al_2O_3$), metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g., $Na_3AlF_6$ or $Na_5Al_3F_{14}$), neodymium fluoride ($NdF_3$), samarium fluoride ($SmF_3$), barium fluoride ($BaF_2$), calcium fluoride ($CaF_2$), lithium fluoride (LiF), combinations thereof, or any other low index material having an index of refraction of about 1.65 or less. For example, organic monomers and polymers can be utilized as low index materials, including dienes or alkenes such as acrylates (e.g., methacrylate), perfluoroalkenes, polytetrafluoroethylene (Teflon), fluorinated ethylene propylene (FEP), combinations thereof, and the like.

It should be appreciated that several of the above-listed dielectric materials are typically present in non-stoichiometric forms, often depending upon the specific method used to deposit the dielectric material as a coating layer, and that the above-listed compound names indicate the approximate stoichiometry. For example, silicon monoxide and silicon dioxide have nominal 1:1 and 1:2 silicon:oxygen ratios, respectively, but the actual silicon:oxygen ratio of a particular dielectric coating layer varies somewhat from these nominal values. Such non-stoichiometric dielectric materials are also within the scope of the present invention.

As mentioned above, the dielectric layers can be formed of high/low dielectric optical stacks, which have alternating layers of low index (L) and high index (H) materials. When a dielectric layer is formed of a high/low dielectric stack, the color shift at angle will depend on the combined refractive index of the layers in the stack. Examples of suitable stack configurations for the dielectric layers include LH, HL, LHL, HLH, HLHL, LHLH, as well as various multiples and combinations thereof. In these stacks, LH, for example, indicates discrete layers of a low index material and a high index material. In an alternative embodiment, the high/low dielectric stacks are formed with a gradient index of refraction. For example, the stack can be formed with layers having a graded index low-to-high, a graded index high-to-low, a graded index low-to-high-to-low, a graded index high-to-low-to-high, as well as combinations and multiples thereof. The graded index is produced by a gradual variance in the refractive index, such as low-to-high index or high-to-low index, of adjacent layers. The graded index of the layers can be produced by changing gases during deposition or co-depositing two materials (e.g., L and H) in differing proportions. Various high/low optical stacks can be used to enhance color-shifting performance, provide antireflective properties to the dielectric layer, and change the possible color space of the pigments of the invention.

The dielectric layers can each be composed of the same material or a different material, and can have the same or different optical or physical thickness for each layer. It will be appreciated that when the dielectric layers are composed of different materials or have different thicknesses, the flakes exhibit different colors on each side thereof and the resulting mix of flakes in a pigment or paint mixture would show a new color which is the combination of the two colors. The resulting color would be based on additive color theory of the two colors coming from the two sides of the flakes. In a multiplicity of flakes, the resulting color would be the additive sum of the two colors resulting from the random distribution of flakes having different sides oriented toward the observer.

The absorber layers 26a and 26b of flake 20 can be composed of any absorber material having the desired absorption properties, including both selective absorbing materials and nonselective absorbing materials. For example, the absorber layers can be formed of nonselective absorbing metallic materials deposited to a thickness at which the absorber layer is at least partially absorbing, or semi-opaque. Nonlimiting examples of suitable absorber materials include metallic absorbers such as chromium, aluminum, nickel, palladium, platinum, titanium, vanadium, cobalt, iron, tin, tungsten, molybdenum, rhodium, niobium, as well as other absorbers such as carbon, graphite, silicon, germanium, cermet, ferric oxide or other metal oxides, metals mixed in a dielectric matrix, and other substances that are capable of acting as a uniform or selective absorber in the visible spectrum. Various combinations, mixtures, compounds, or alloys of the above absorber materials may be used to form the absorber layers of flake 20.

Examples of suitable alloys of the above absorber materials include Inconel (Ni—Cr—Fe), and titanium-based alloys, such as titanium mixed with carbon (Ti/C), titanium mixed with tungsten (Ti/W), titanium mixed with niobium (Ti/Nb), and titanium mixed with silicon (Ti/Si), and combinations thereof. Examples of suitable compounds for the absorber layers include titanium-based compounds such as titanium nitride (TiN), titanium oxynitride ($TiN_xO_y$), titanium carbide (TiC), titanium nitride carbide ($TiN_xC_z$), titanium oxynitride carbide ($TiN_xO_yC_z$), titanium silicide ($TiSi_2$), titanium boride ($TiB_2$), and combinations thereof. In the case of $TiN_xO_y$ and $TiN_xO_yC_z$, preferably x=0 to 1, y=0 to 1, and z=0 to 1, where x+y=1 in $TiN_xO_y$ and x+y+z=1 in $TiN_xO_yC_z$. For $TiN_xC_z$, preferably x=0 to 1 and z=0 to 1, where x+z=1. Alternatively, the absorber layers can be composed of a titanium-based alloy disposed in a matrix of Ti, or can be composed of Ti disposed in a matrix of a titanium-based alloy.

The absorber layers are formed to have a physical thickness in the range from about 30 Å to about 500 Å, and preferably about 100 Å to about 175 Å, depending upon the optical constants of the absorber layer material and the desired peak shift. The absorber layers can each be composed of the same material or a different material, and can have the same or different physical thickness for each layer.

As shown in FIG. 1, luminescent coating layer 28 is formed to substantially encapsulate multilayer core 21 of flake 20. The luminescent coating layer 28 can be composed of either an organic or inorganic material which has the property of luminescence. In general, luminescence is the emission of electromagnetic radiation, or light, from a material without any associated change in temperature, resulting from such causes as chemical reactions, electron bombardment, electromagnetic radiation, and electric fields. Many luminescent materials are excited by high-energy photons or electrons, absorbing incident electromagnetic radiation in one wavelength range, and emitting electromagnetic radiation in another. Luminescence is typically subdivided into the subcategories of fluorescence and phosphorescence. Fluorescence occurs where a substance emits electromagnetic radiation while absorbing some form of energy, with the emission ceasing abruptly when the input energy ceases. Phosphorescence occurs where a substance emits light following the absorption of energy, with the emission continuing for a relatively long time after the energy input has ceased. Additional subcategories of luminescence include polarization of the incident electromagnetic radiation, and non-linear optical effects such as second harmonic generation.

The luminescent materials used in the present invention can be excited by various energy sources such as infrared radiation, ultraviolet radiation, visible light, electric fields (electroluminescence), magnetic fields (magnetoluminescence), chemical reaction (chemoluminescence), and mechanical stress (triboluminescence).

Nonlimiting examples of suitable organic luminescent materials include fluorescent dyes such as those in the coumarin class, the xanthane class, the acridine class, and numerous others as known to those skilled in the art. Specific examples include Dansyl, prodene, fluorescene, rhodamine, and the like. A fluorescent dye can also be combined with a liquid crystal polymer for coating onto the color-shifting pigment flakes.

Incorporation of a fluorescent dye in a liquid crystal polymer coated onto color-shifting pigment flakes introduces an unexpected effect related to overt nonlinear optical properties. Under the proper temperature and electric field conditions the dye molecules will orient along with the liquid crystal chains. Upon cooling and removal of the electric field, the fluorescent dye coating will have a phase associated with its absorption and emission bands. Fluorescent dye, such as those in the coumarin class, can be poled in the same fashion as above using a non-liquid crystal system such as disclosed in U.S. Pat. No. 5,286,803 to Lindsay et al., the disclosure of which is incorporated by reference herein. This feature can be observed under a microscope using polarizing filters or using procedures similar to those described in the Lindsay patent.

Other suitable luminescent materials that can be used in the present invention include the dyes in U.S. Pat. Nos. 4,173,002, 5,329,540, and 5,912,257, the disclosures of which are incorporated by reference herein. Suitable inorganic luminescent materials for use in the invention include halophosphate phosphors, phosphate phosphors, silicate phosphors, aluminate phosphors, borate phosphors, tungstate phosphors, lanthanide phosphors, and the like.

Additional luminescent materials useful in the invention include electroluminescent materials such as ZnS, $Mn^{++}$, ZnS:TbF$_3$, and pi-conjugated polymers; chemoluminescent materials such as dioxetanes, and acridinium salts; and second harmonic generators such as nitrogen-substituted amine stilbene derivatives, molecular complexes of SbI$_3$ and sulfur, non-centrosymmetric dye aggregates. The luminescent material may also be composed of solid phase or water-soluble quantum dot particles, such as are disclosed in PCT Publication No. WO 00/29617. Such quantum dot particles comprise a core, a cap and a hydrophilic attachment group. The "core" is a nanoparticle-sized semiconductor. While any core of the IIB–VIB, IIIB–VB or IVB–IVB semiconductors can be used, the core must be such that, upon combination with a cap, a luminescent quantum dot results. A IIB–VIB semiconductor is a compound that contains at least one element from Group IIB and at least one element from Group VIB of the periodic table, and so on. Preferably, the core is a IIB–VIB, IIIB–VB or IVB–IVB semiconductor that ranges in size from about 1 nm to about 10 nm. The core is more preferably a IIB–VIB semiconductor and ranges in size from about 2 nm to about 5 nm. Most preferably, the core is CdS or CdSe. In this regard, CdSe is especially preferred as the core, in particular at a size of about 4.2 nm.

The "cap" is a semiconductor that differs from the semiconductor of the core and binds to the core, thereby forming a surface layer on the core. The cap must be such that, upon combination with a given semiconductor core, a luminescent quantum dot results. The cap should passivate the core by having a higher band gap than the core. In this regard, the cap is preferably a IIB–VIB semiconductor of high band gap. More preferably, the cap is ZnS or CdS. Most preferably, the cap is ZnS. In particular, the cap is preferably ZnS when the core is CdSe or CdS and the cap is preferably CdS when the core is CdSe.

The "attachment group" as that term is used herein refers to any organic group that can be attached, such as by any stable physical or chemical association, to the surface of the cap of the luminescent semiconductor quantum dot and can render the quantum dot water-soluble without rendering the quantum dot no longer luminescent. Accordingly, the attachment group comprises a hydrophilic moiety. Preferably, the attachment group enables the hydrophilic quantum dot to remain in solution for at least about one hour. More preferably the attachment group enables the hydrophilic quantum dot to remain in solution for at least about one day. Even more preferably, the attachment group allows the hydrophilic quantum dot to remain in solution for at least about one week, most preferably for at least about one month. Desirably, the attachment group is attached to the cap by covalent bonding and is attached to the cap in such a manner that the hydrophilic moiety is exposed. Preferably, the hydrophilic attachment group is attached to the quantum dot via a sulfur atom. More preferably, the hydrophilic attachment group is an organic group comprising a sulfur atom and at least one hydrophilic attachment group. Suitable hydrophilic attachment groups include, for example, a carboxylic acid or salt thereof, a sulfonic acid or salt thereof, a sulfamic acid or salt thereof, an amino substituent, a quaternary ammonium salt, and a hydroxy. The organic group of the hydrophilic attachment group is preferably a $C_1$–$C_6$ alkyl group or an aryl group, more preferably a $C_1$–$C_6$ alkyl group, even more preferably a $C_1$–$C_3$ alkyl group. Therefore, in a preferred embodiment, the attachment group of the present invention is a thiol carboxylic acid or thiol alcohol. More preferably, the attachment group is a thiol carboxylic acid. Most preferably, the attachment group is mercaptoacetic acid.

A preferred embodiment of a water-soluble luminescent semiconductor quantum dot is one that comprises a CdSe core of about 4.2 nm in size, a ZnS cap and an attachment group. Another preferred embodiment of a water-soluble luminescent semiconductor quantum dot is one that comprises a CdSe core, a ZnS cap, and a mercaptoacetic acid attachment group. An especially preferred water-soluble luminescent semiconductor quantum dot comprises a CdSe core of about 4.2 nm, a ZnS cap of about 1 nm, and a mercaptoacetic acid attachment group.

In another embodiment, a composition comprising a water-soluble luminescent semiconductor quantum dot as described above and an aqueous carrier is provided. Any suitable aqueous carrier can be used in the composition. Desirably, the carrier renders the composition stable at a desired temperature, such as room temperature, and is of an approximately neutral pH. Examples of suitable aqueous carriers are known to those of ordinary skill in the art and include saline solution and phosphate-buffered saline solution (PBS).

The luminescent coating layer can comprise any of the above luminescent materials singly, or in a variety of combinations. For example, a plurality of different fluorescent materials can be used such that a first fluorescent material absorbs and emits light at one set of wavelengths and a second fluorescent material absorbs and emits light at another set of wavelengths different from the first fluorescent material. Alternatively, the luminescent coating layer could contain a first luminescent material, which is light-excited, and a second luminescent material, which is composed of an electroluminescent material. One skilled in the art will recognize, in view of the disclosure herein, that a wide variety of luminescent materials and combinations thereof could be combined to create greatly enhanced effects.

The luminescent coating layer is formed to have a thickness of about 50 Å to about 20,000 Å, more preferably from about 50 Å to about 5,000 Å, and most preferably from about 50 Å to about 2500 Å.

One presently preferred method of fabricating a plurality of luminescent pigment flakes, each of which having the multilayer thin film coating structure of flake 20, is based on conventional web coating techniques used to make optical thin films. Accordingly, a first absorber layer is deposited on a web of flexible material such as polyethylene terephthalate (PET) which has an optional release layer thereon. The absorber layer can be formed by a conventional deposition process such as PVD, CVD, PECVD, sputtering, or the like. The above mentioned deposition methods enable the formation of a discrete and uniform absorber layer of a desired thickness.

Next, a first dielectric layer, for example, is deposited on the absorber layer to a desired optical thickness by a conventional deposition process. The deposition of the dielectric layer can be accomplished by a vapor deposition process (e.g., PVD, CVD, PECVD).

The reflector layer is then deposited on the first dielectric layer, taking on the characteristics of the underlying dielectric layer. This is followed by a second dielectric layer being deposited on the reflector layer and preferably having the same optical thickness as the first dielectric layer. Finally, a second absorber layer is deposited on the second dielectric layer and preferably has the same physical thickness as the first absorber layer.

Thereafter, the flexible web is removed, either by dissolution in a preselected liquid or by way of a release layer, both of which are well known to those skilled in the art. As a result, a plurality of flakes are fractured out during removal of the web from the multilayer thin film. This method of manufacturing pigment flakes is similar to that more fully described in U.S. Pat. No. 5,135,812 to Phillips et al., the disclosure of which is incorporated by reference herein. The pigment flakes can be further fragmented if desired by, for example, grinding the flakes to a desired size using an air grind, such that the pigment flakes have a dimension on any surface thereof ranging from about 2 microns to about 200 microns.

The luminescent coating layer 28 can then be applied to each of the preformed pigment flakes by a variety of encapsulation coating methods. For example, the luminescent coating layer can be formed by applying a polymeric coating, such as a coating of polyacrylates or polyurethanes, to the pigment flakes by a wet chemical coating method where the luminescent moiety is chemically bound to the polymer.

In another method, a layer of silica is applied to the outside of the pigment flakes, and a luminescent dye is chemically bound to the silica through reaction with free hydroxyl groups on the silica surface. Alternatively, the luminescent dye is bound to the silica surface through hydrogen bonding of an amine, acid, or alcohol group on the dye molecule with free hydroxyl groups on the silica surface. The dye can also be incorporated by covalent bonding, such as for example in ormosils.

In yet another method, the pigment flakes can be encapsulated by a process comprising dissolving a luminescent material in a sol-gel solution, immersing the pigment flakes in the sol-gel solution to form coated pigment flakes, and separating the coated pigment flakes from the sol-gel solution. Alternatively, the pigment flakes can be encapsulated by a process comprising forming porous nanospheres from a sol-gel solution, and imbibing the nanospheres with a luminescent material to produce luminescent nanospheres. The pigment flakes are immersed in the sol-gel solution to form coated pigment flakes encapsulated with the luminescent nanospheres, and the coated pigment flakes are separated from the sol-gel solution.

In yet another method, a mono-layer of silica or aluminum oxide nano-particles is deposited onto the pigment flakes by rinsing the flakes with a dispersion of the nano-particles. The nano-particles are then fused to the pigment flake surfaces by calcining. The calcined pigment flakes are then rinsed with a solution of a fluorescent dye, which is adsorbed onto the surface of the flakes through hydrogen bonding with the nano-particles.

In a further method, a luminescent dye is employed that contains an acrylic functionality. Initially, a batch of preformed pigment flakes are exposed to ultraviolet (UV) light and air, and are placed in a vacuum. The UV light is removed and a small amount of polymerizable luminescent dye monomer is added to and mixed with the pigment flakes. The mixture is then heated to volatilize the luminescent dye. A peroxide species is formed on the pigment flake surfaces, which initiates the polymerization of the luminescent dye on the pigment flake surfaces. The thickness of the polymerized dye layer is limited by the ability of the dye monomer to reach an active site. Thus, as the thickness of polymerized dye increases it prevents monomer from reaching the activating sites nearer the pigment flake surfaces.

In yet another method, the pigment flakes are coated with a thin layer of an epoxy-based polymer cured at room temperature. The coated pigment flakes are then rotated in a vacuum in the presence of a luminescent dye and heat, with the dye defusing into the polymer at the elevated temperature. This temperature is above the glass transition temperature (Tg) of the polymer-dye mixture. When cooled below the system Tg, the luminescent dye is locked into the coating.

In an alternative embodiment of an encapsulated luminescent color-shifting flake, an asymmetrical color-shifting flake can be provided which includes a three-layer thin film stack structure having the same layers as on one side of the reflector layer of flake 20 shown in FIG. 1. Accordingly, the asymmetrical color-shifting flake includes a multilayer core of a reflector layer, a dielectric layer on the reflector layer, and an absorber layer on the dielectric layer. A luminescent coating layer substantially surrounds the multilayer core flake. Each of these layers can be composed of the same materials and have the same thicknesses as described above for the corresponding layers of the above discussed flake 20. In addition, asymmetrical luminescent color-shifting flakes can be formed by a web coating process such as described above in which the various layers are sequentially deposited on a web material to form a three-layer thin film structure, which is subsequently fractured and removed from the web to form a plurality of flakes. These preformed flakes are then coated with a luminescent coating layer by any of the methods described previously.

Figure 2:
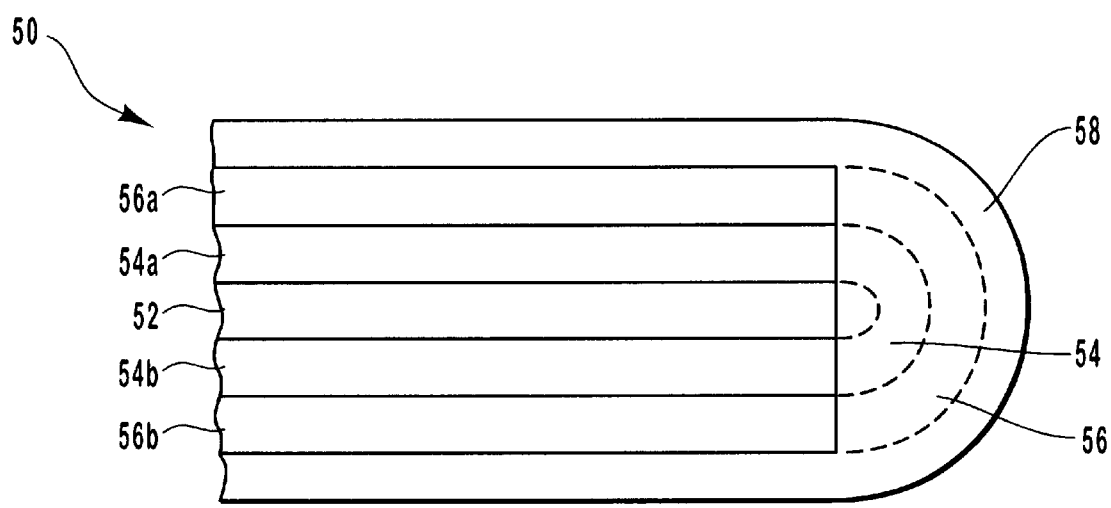
FIG. 2 is a schematic representation of another luminescent color-shifting structure according to the invention.

FIG. 2 depicts alternative coating structures (with phantom lines) for a color-shifting pigment flake 50 in the form of an encapsulate according to other embodiments of the invention. The flake 50 has a core layer 52, which can be overcoated by an encapsulating dielectric layer 54 substantially surrounding core layer 52, and an absorber layer 56 that overcoats dielectric layer 54. The hemispherical dotted lines on one side of flake 50 indicate that dielectric layer 54 and absorber layer 56 can be formed as contiguous layers. Finally, flake 50 has a luminescent coating layer 58 which substantially surrounds absorber layer 56.

Alternatively, core layer 52 and dielectric layer 54 can be in the form of a thin film core flake stack, in which opposing dielectric layers 54a, 54b are preformed on the top and bottom surfaces but not on at least one side surface of core layer 52. The absorber layer 56 can be formed as an encapsulating layer, or can be formed as discrete opposing absorber layers 56a, 56b on dielectric layers 54a, 54b. The luminescent coating layer 58 substantially surrounds the interior layers of flake 50.

An encapsulation process can also be used to form additional layers on flake 50 such as a capping layer (not shown). Suitable materials and thicknesses for the dielectric layer(s), absorber layer(s), and luminescent coating layer of flake 50 are the same as taught hereinabove for corresponding layers of flake 20 in FIG. 1.

The core layer 52 can comprise a metallic reflector such as discussed above for reflector layer 22 of flake 20, as well as other materials such glass, silica, mica, indium-tin-oxide (ITO), needles, micropatterned particles, liquid crystal platelets, and the like.

In addition, core layer 52 can be a multi-layered core flake section structure, such as a "bright metal flake" as disclosed in U.S. Pat. No. 6,013,370 to Coulter et al., and U.S. application Ser. No. 09/207,121, filed Dec. 7, 1998, now U.S. Pat. No. 6,150,022, the disclosures of which are incorporated by reference herein. Such a multi-layered structure includes a reflector sublayer having a top surface, a bottom surface, and at least one side surface, and a support sublayer preformed on at least one of the top and bottom surfaces but not on the at least one side surface of the reflector sublayer. The reflector sublayer can be a metal such as aluminum having a thickness of at least about 40 nm, and the support layer(s) can be a dielectric such as silicon oxide having a thickness of at least about 10 nm, with the thickness being chosen so that the dielectric sublayers do not substantially affect the color properties of the reflector sublayer. For example, a multilayered core flake section can have the coating structure $SiO_x/Al/SiO_x$, where x is from about 1 to about 2.

The core layer 52 can also be a multi-layered structure such as a "composite reflective flake" as disclosed in U.S. application Ser. No. 09/626,041, filed Jul. 27, 2000, the disclosure of which is incorporated by reference herein. Such a multi-layered structure includes a central support sublayer having a top surface, a bottom surface, and at least one side surface, and a reflector sublayer preformed on one or both of the top and bottom surfaces but not on the at least one side surface of the reflector sublayer.

Figure 3:
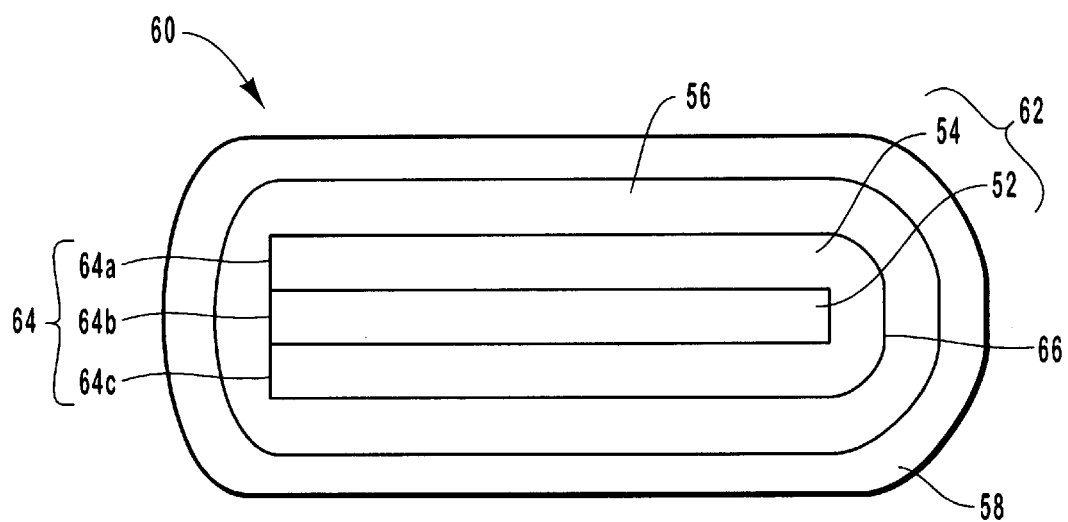
FIG. 3 is a schematic representation of yet another luminescent color-shifting structure according to the invention.

FIG. 3 depicts another alternative coating structure for a color-shifting pigment flake 60 according to the present invention. The flake 60 includes a core reflector layer 52 and a single dielectric layer 54, which extends over top and bottom surfaces of reflector layer 52 to form a dielectric-coated preflake 62. The dielectric-coated preflake has two side surfaces 64 and 66. Although side surface 66 is homogeneous and formed only of the dielectric material of dielectric layer 54, side surface 64 has distinct surface regions of dielectric 64a, reflector 64b, and dielectric 64c, respectively. The dielectric-coated preflake is further coated on all sides with an absorber layer 56. The absorber layer is in contact with the dielectric layer 54 and the reflector layer 52 at side surface 64. Finally, a luminescent coating layer 58 substantially surrounds the interior layers.

The structure of the pigment flake 60 typically occurs because of a preflake coating process such as disclosed in U.S. application Ser. No. 09/512,116, filed on Feb. 24, 2000, now abandoned, the disclosure of which is incorporated by reference herein. In such a process, one or more thin film layers including at least a core reflector layer are deposited on a web to form a film, which is subsequently fractured and removed from the web to form a plurality of pigment preflakes. The preflakes can be a dielectric-coated flake, in which a dielectric coating completely encapsulates a core flake section. The preflakes are broken into sized preflakes using any conventional fragmentation process, such as by grinding. The sized preflakes will include some sized preflakes having top and bottom dielectric layers with no dielectric material overcoating the side surfaces of the preflake, such as shown for one embodiment of flake 50 in FIG. 2 in which the reflector layer is coated with top and bottom dielectric layers. Other sized preflakes will have a single dielectric layer extending over both top and bottom surfaces of the core flake section, leaving one side surface of the core flake section exposed, such as shown for dielectric-coated preflake 62 in FIG. 3. Because of the fragmentation process, substantially all of the sized preflakes have at least a portion of a side surface exposed. The sized preflakes are then coated on all sides with an absorber layer, such as shown for flake 60 of FIG. 2. Finally, the luminescent coating layer is formed around the absorber layer of the flakes by any of the methods described previously.

Figure 4:
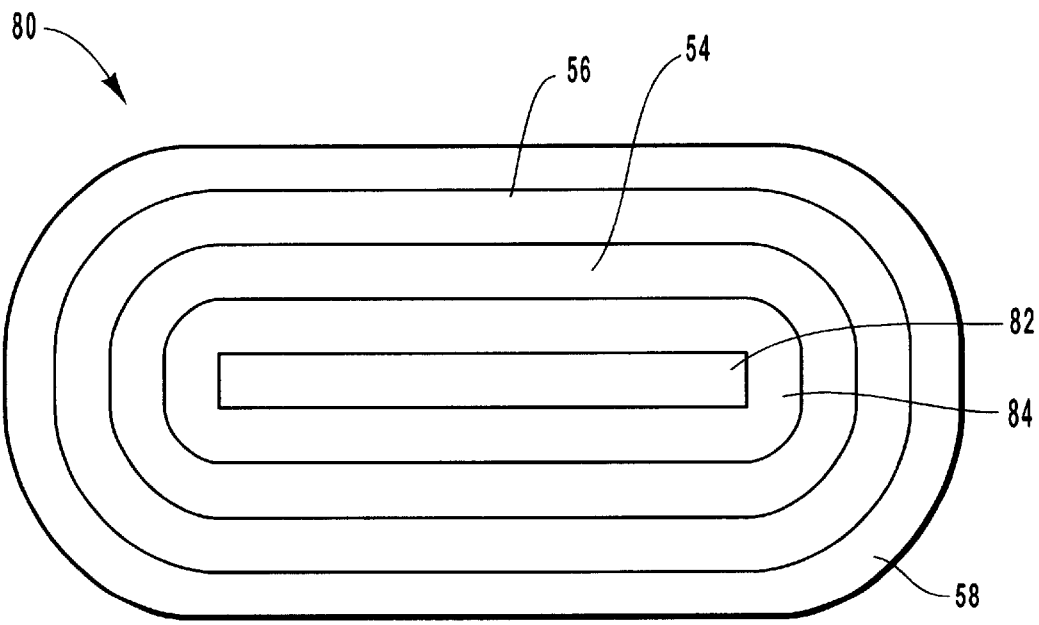
FIG. 4 is a schematic representation of yet another luminescent color-shifting structure according to the invention.

FIG. 4 depicts another alternative coating structure for a color-shifting pigment flake 80 in the form of an encapsulate. The flake has a thin core layer 82, which can be formed of a particulate substrate material that provides rigidity, such as mica, glass flake, talc, or other silicatic material, as well as iron oxide, boron nitride, and the like. The core layer 82 is overcoated on all sides with a reflector coating 84, such as a reflective metallic coating, which can be composed of the same materials as described above for reflector layer 22 of flake 20. An encapsulating dielectric layer 54 substantially surrounds reflector coating 84, and an absorber layer 56 overcoats dielectric layer 54. A luminescent coating 58 substantially surrounds the interior layers of flake 80 and is formed by any of the methods described previously.

Various coating processes can be utilized in forming the dielectric and absorber coating layers of the above embodiments by encapsulation. For example, suitable preferred methods for forming the dielectric layer include vacuum vapor deposition, sol-gel hydrolysis, CVD in a fluidized bed, and electrochemical deposition. A suitable $TiO_2$ sol-gel process is described in U.S. Pat. No. 5,858,078 to Andes et al., the disclosure of which is incorporated by reference herein. Other examples of suitable sol-gel coating techniques useful in the present invention are disclosed in U.S. Pat. No. 4,756,771 to Brodalla et al., the disclosure of which is incorporated by reference herein; Zink et al., Optical Probes and Properties of Aluminosilicate Glasses Prepared by the Sol-Gel Method, Polym. Mater. Sci. Eng., 61, pp. 204–208 (1989); and McKiernan et al., Luminescence and Laser Action of Coumarin Dyes Doped in Silicate and Aluminosilicate Glasses Prepared by the Sol-Gel Technique, J. Inorg. Organomet. Polym., 1(1), pp. 87–103 (1991).

Suitable preferred methods for forming the absorber layers include vacuum vapor deposition, and sputtering onto a mechanically vibrating bed of particles, such as disclosed in U.S. application Ser. No. 09/389,962, filed Sept. 3, 1999, now U.S. Pat. No. 6,241,858, which is incorporated by reference herein. Alternatively, the absorber coating may be deposited by decomposition through pyrolysis of metal-organo compounds or related CVD processes which may be carried out in a fluidized bed as described in U.S. Pat. Nos. 5,364,467 and 5,763,086 to Schmid et al., the disclosures of which are incorporated by reference herein. Another method of depositing the absorbers of the invention is by plasma enhanced chemical vapor deposition (PECVD) where the chemical species are activated by a plasma. Such a method is disclosed in detail in U.S. application Ser. No. 09/685,468, filed on Oct. 10, 2000, which is incorporated by reference herein.

If no further grinding is carried out, these encapsulation methods result in an encapsulated core flake section with dielectric and absorber materials therearound. Various combinations of the above coating processes may be utilized during manufacture of pigment flakes with multiple encapsulating coatings. When pigment flakes are formed by a sequential encapsulation process, it will be appreciated that each respective encapsulating layer is generally a continuous layer composed of one material and having substantially the same thickness around the flake structure.

Figure 5:
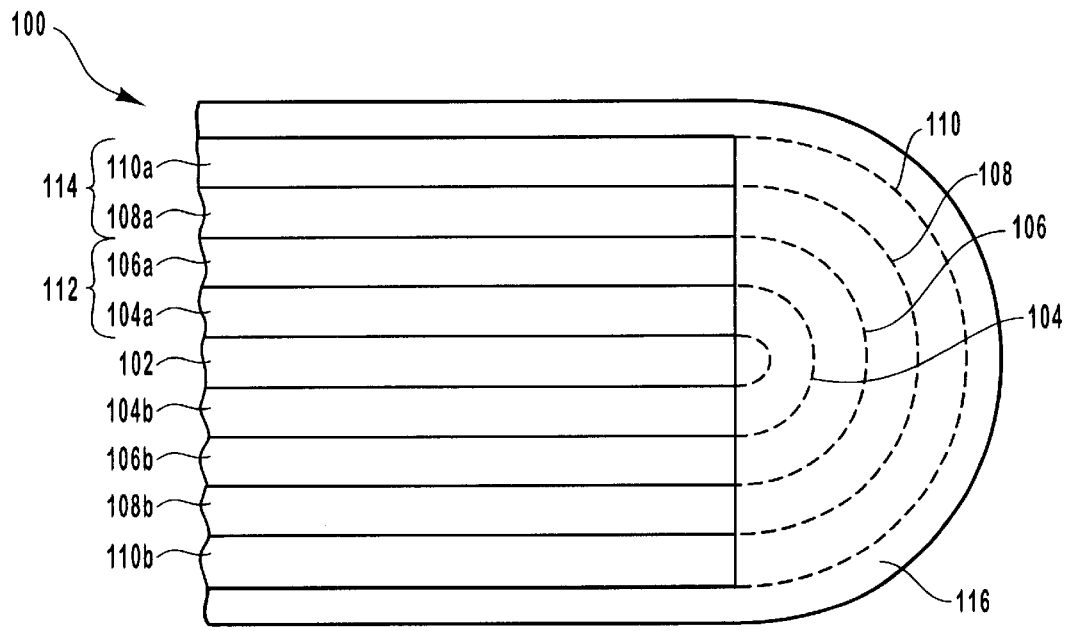
FIG. 5 is a schematic representation of a further luminescent color-shifting structure according to the invention.

FIG. 5 depicts a luminescent color-shifting pigment flake 100 according to another embodiment of the invention. The flake 100 is a generally symmetrical multilayer thin film stack structure on opposing sides of a reflector layer 102. Thus, first and second dielectric layers 104a, 104b are disposed respectively on opposing sides of reflector layer 102, and first and second absorber layers 106a, 106b are disposed respectively on each of the dielectric layers 104a, 104b. A third dielectric layer 108a is formed on the first absorber layer 106a, and a fourth dielectric layer 108b is formed on the second absorber layer 106b. A third absorber layer 110a is formed on the third dielectric layer 108a, and a fourth absorber layer 110b is on the fourth dielectric layer 108b. These layers of flake 100 can be formed by a web coating and flake removal process as described previously. A luminescent coating layer 116 is formed to substantially surround the interior layers of flake 100 by any of the luminescent layer forming methods described previously.

As shown in FIG. 5, each dielectric and absorber layer pair forms a repeating period 112, 114, of dielectric/absorber (e.g., layers 104a and 106a, and layers 108a and 110a). One or more additional periods of dielectric/absorber layers may be added to flake 100 to obtain a desired optical effect.

FIG. 5 further shows an alternative coating structure (with phantom lines) for the luminescent color-shifting flake 100, in which one or more of the absorber layers and dielectric layers are coated around reflector layer 102 in an encapsulation process. For example, when an encapsulation process is used to form an outer absorber layer, absorber layers 110a and 110b are formed as part of a continuous absorber coating layer 110 substantially surrounding the flake structure thereunder. Likewise, an encapsulation process can also be used in forming an underlying dielectric layer, such that dielectric layers 108a and 108b are formed as part of a continuous dielectric coating layer 108 substantially surrounding the flake structure thereunder. An encapsulation process can also be used in forming the other dielectric 104 and absorber 106 layers such that reflector layer 102 is encapsulated sequentially with alternating dielectric and absorber layers.

Thus, the pigment flake 100 may be embodied either as an encapsulated multilayer thin film stack flake with one or more encapsulating layers therearound, or a multilayer thin film encapsulated particle with all layers being encapsulated by an overlying layer. Suitable materials and thicknesses for the absorber, dielectric, reflector, and luminescent coatings of flake 100 are the same as taught hereinabove for flake 20.

Figure 6:
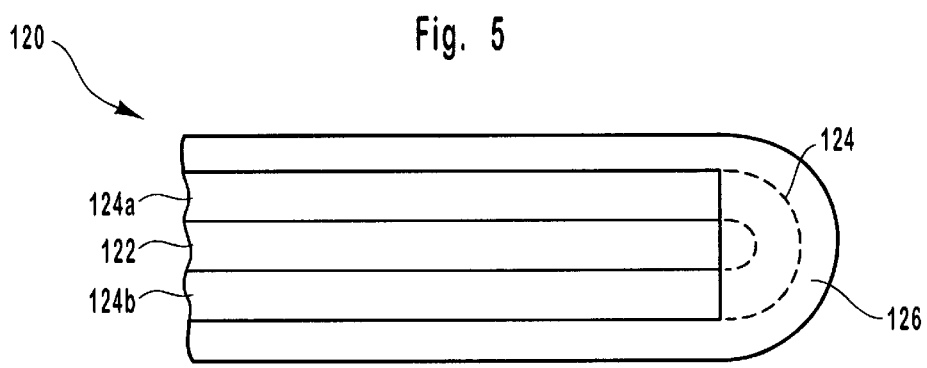
FIG. 6 is a schematic representation of yet another luminescent color-shifting structure according to the invention.

FIG. 6 depicts a luminescent color-shifting pigment flake 120 according to another embodiment of the invention which does not use a reflector. The flake 120 is an encapsulated three-layer design having a generally symmetrical multilayer thin film structure on opposing sides of a dielectric layer 122. Thus, first and second absorber layers 124a and 124b are formed on opposing major surfaces of dielectric layer 122. These layers of flake 120 can be formed by a web coating and flake removal process as described previously. A luminescent coating layer 126 substantially surrounds the interior layers.

FIG. 6 further depicts an alternative coating structure (with phantom lines) for the luminescent color-shifting flake 120, in which an absorber layer is coated around dielectric layer 122 in an encapsulation process. Accordingly, absorber layers 124a and 124b are formed as part of a continuous absorber coating layer 124 substantially surrounding dielectric layer 122, with luminescent coating layer 126 substantially surrounding absorber coating layer 124.

Thus, pigment flake 120 may be embodied either as a multilayer thin film stack flake or a multilayer thin film encapsulated particle. Suitable materials and thicknesses for the absorber, dielectric, and luminescent coatings of flake 120 are the same as taught hereinabove for flake 20.

Figure 7:
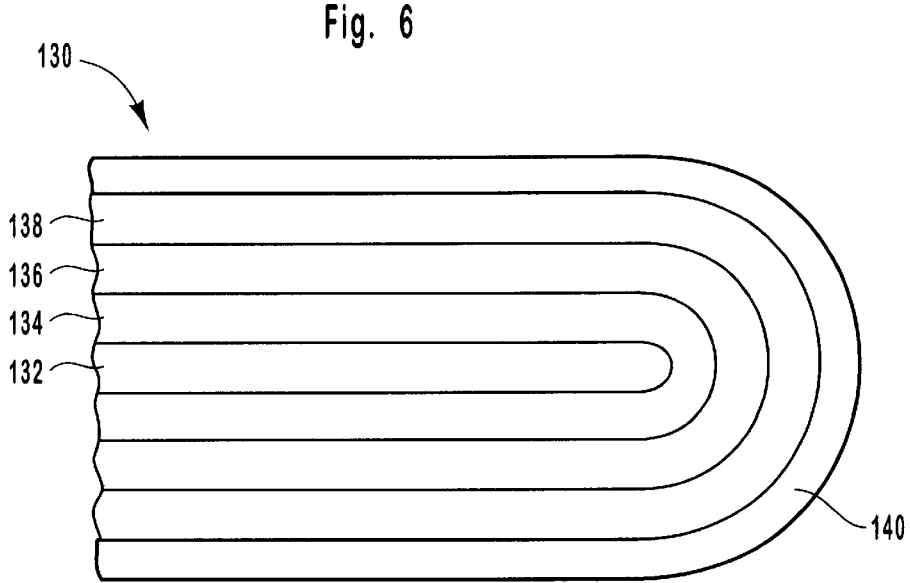
FIG. 7 is a schematic representation of yet another luminescent color-shifting structure according to the invention.

FIG. 7 illustrates a pigment flake 130 according to a further embodiment of the present invention. Pigment flake 130 comprises a core layer 132 which is substantially encapsulated by a first absorber layer 134. The absorber layer 134 is in turn encapsulated by a dielectric layer 136, such as a layer of $SiO_2$ or high index $TiO_2$ formed by a sol-gel process. A second absorber layer 138 encapsulates dielectric layer 136. A luminescent coating layer 140 is formed to substantially surround the inner layers of flake 130. Thus, pigment flake 130 is embodied as a multilayer thin film encapsulated particle. The core layer 132 is preferably a flat, transparent planar material such as mica, glass, silica, indium tin oxide (ITO), or other dielectric material, which gives strength to the flake. Suitable materials and thicknesses for the absorber and luminescent layers of flake 130 are the same as taught hereinabove for flake 20.

Some flakes of the invention can be characterized as multilayer thin film interference structures in which layers lie in parallel planes such that the flakes have first and second parallel planar outer surfaces and an edge thickness perpendicular to the first and second parallel planar outer surfaces. Such flakes are produced to have an aspect ratio of at least about 2:1, and preferably about 5–15:1 with a narrow particle size distribution. The aspect ratio of the flakes is ascertained by taking the ratio of the longest planar dimension of the first and second outer surfaces to the edge thickness dimension of the flakes.

As discussed previously, the optically variable or color shifting pigment flakes that are coated with a luminescent material are not only multilayer optical interference pigments, but can also be solid pigments comprising one or more solidified polymeric liquid crystal components. Such liquid crystal polymer flakes are well known to those skilled in the art. For example, suitable liquid crystal polymer (LCP) structures are described in U.S. Pat. No. 5,824,733 to Dobert et al., the disclosure of which is incorporated by reference herein. These LCP structures have a color that depends on the viewing angle, and are composed of oriented, three-dimensionally crosslinked substances of liquid-crystalline structure with a chiral phase. The LCP structures can be obtained by subjecting one or more three-dimensionally crosslinkable liquid-crystalline substances with a chiral phase to orientation, then to three-dimensional crosslinking, and subsequently to comminution to the desired particle size. The LCP structures obtained are platelet-like particles essentially comprising the cross-linked substance of a liquid crystal structure (i.e., the polymeric or monomeric fluid prior to crosslinking was in an ordered state of the liquid crystal type). Alternatively, the LCP structures can be formed by coating platelet-like particles with a liquid crystal material as described in U.S. Pat. No. 5,242,617 to Metzger et al., the disclosure of which is incorporated by reference herein. The LCP structures obtained can be overcoated with a luminescent material layer according to methods of the present invention as described previously.

Accordingly, in another embodiment of the invention, a luminescent color-shifting pigment flake includes an optically variable layer having a first surface and a second surface opposite the first surface, with the optically variable layer comprising one or more solidified polymeric liquid crystal components. A luminescent coating layer is formed over at least one of the first or second surfaces of the optically variable layer, and can be formed to substantially surround the optically variable layer.

Alternative pigment flakes that can be coated with a luminescent material according to the instant invention are microdiffractive pigments of the types generally described in U.S. Pat. No. 5,624,076 to Miekka et al., the disclosure of which is incorporated by reference herein. These microdiffractive pigments may have a wide range of optical effects, including, but not limited to, optical variation by color shift with viewing angle. These effects arise from diffractive interference of light reflected off the particle surfaces. The pigment particles are formed with diffraction patterns on their surfaces, with the patterns typically being of three types. A first type includes various diffraction and/or holographic patterns that exhibit desirable optical effects such as iridescence. These can be used for decorative applications, but can also have anti-forgery applications such as when machine readable patterns are formed that function as bar codes. A second type of pattern includes tiny images that are only visible under optical magnification, which can be very effective in anti-forgery applications. A third type of pattern includes tiny holographic images that are only visible under optical magnification. These include machine readable images such as holographic bar codes, which can also be very effective in anti-forgery applications.

The luminescent color-shifting pigment flakes of the present invention can be interspersed within a pigment medium to produce a colorant material which can be applied to a wide variety of objects or papers. The pigment flakes added to a medium produces a predetermined optical response through radiation incident on a surface of the solidified medium. Suitable pigment media include various polymeric materials or organic binders such as acrylic melamine, urethanes, polyesters, vinyl resins, acrylates, methyl methacrylate, ABS resins, epoxies, styrenes, ink and paint formulations based on alkyd resins, and mixtures thereof. The luminescent color-shifting flakes combined with the pigment media produce a colorant material that can be used directly as a paint, ink, or moldable plastic material. The colorant material can also be utilized as an additive to conventional paint, ink, or plastic materials.

In addition, the luminescent color-shifting flakes can be optionally blended with various additive materials such as conventional pigment flakes, particles, or dyes of different hues, chroma and brightness to achieve the color characteristics desired. For example, the flakes can be mixed with other conventional pigments, either of the interference type or noninterference type, to produce a range of other colors. This preblended material can then be dispersed into a polymeric medium such as a paint, ink, plastic or other polymeric pigment vehicle for use in a conventional manner.

Examples of suitable additive materials that can be combined with the luminescent color-shifting flakes of the invention include non-color-shifting high chroma or high reflective platelets which produce unique color effects, such as $MgF_2/Al/MgF_2$ platelets or $SiO_2/Al/SiO_2$ platelets. Other suitable additives that can be mixed with the luminescent color-shifting flakes include lamellar pigments such as aluminum flakes, graphite flakes, glass flakes, iron oxide, boron nitride, mica flakes, interference based $TiO_2$ coated mica flakes, interference pigments based on multiple coated plate-like silicatic substrates, metal-dielectric or all-dielectric interference pigments, and the like; and non-lamellar pigments such as aluminum powder, carbon black, ultramarine blue, cobalt based pigments, organic pigments or dyes, rutile or spinel based inorganic pigments, naturally occurring pigments, inorganic pigments such as luminescent material dioxide, talc, china clay, and the like; as well as various mixtures thereof. For example, pigments such as aluminum powder or carbon black can be added to control lightness and other color properties.

As discussed hereinabove, it is desirable to add additional covert features to color-shifting devices. Accordingly, it has been advantageously discovered that the luminescent color-shifting pigments of the present invention can effectively be used in a mixture with distinct luminescent color-shifting pigments or non-luminescent color-shifting pigments in varying predetermined ratios to add covert features to color-shifting pigment compositions. The covert feature provides a particular advantage in packaging and sales of the color-shifting pigments to customers because the covert feature allows the manufacturer to track their products based upon the customer to whom it is sold.

Thus, a luminescent color-shifting pigment composition can comprise a mixture of non-luminescent color-shifting pigments and luminescent color-shifting pigments. For example, a product with a preferred color shift can be sold in a mixture of about 80 wt-% of the non-luminescent color-shifting pigment and about 20 wt-% of the luminescent color-shifting pigment to one customer. Another product could be sold to a different customer with about 60 wt-% of the non-luminescent color-shifting pigment and about 40% of the luminescent color-shifting pigment. Although the pigment compositions will have virtually identical color-shifting features, the differing percentages of luminescent pigments will create two products with differing magnitudes of luminescence as a covert feature. Therefore, while only manufacturing two color-shifting pigment products that have the same color shift (one luminescent), a variety of distinguishable color-shifting devices can be produced by varying the ratio of the two pigments in the mixture to produce color-shifting compositions that have varying predetermined degrees of luminescence.

Accordingly, another embodiment of the invention is directed to a colorant composition which includes luminescent and non-luminescent color shifting pigment flakes mixed in a predetermined ratio and dispersed in a pigment medium. In one preferred embodiment, the luminescent and non-luminescent color-shifting pigment flakes are combined in a mixture comprising at least about 1 wt-% luminescent color-shifting pigment flakes prior to dispersing in a pigment medium. In a more preferred embodiment, the luminescent and non-luminescent color-shifting pigment flakes are combined in a mixture comprising at least about 10 wt-% luminescent color-shifting pigment flakes prior to dispersing in a pigment medium.

Because the varying percentages of luminescent color-shifting pigment flakes is measurable, a manufacturer or distributor of the product can track the use of the product they have sold to individual customers to ensure compliance with sales contracts. The covert feature can also be used in anti-counterfeiting measures for various products and documents. The covert feature allows the manufacture of the luminescent and non-luminescent color-shifting pigments to distinguish individual colorant compositions even though they may be indistinguishable to those unaware of the covert feature.

Of course one skilled in the art will recognize, in light of the disclosure herein, that multiple varieties of non-luminescent and luminescent color-shifting flakes may be combined to vary and increase the number of covert features in the ink. Thus, two or more distinct luminescent color-shifting pigments can be combined in a mixture with a non-luminescent color-shifting pigment. All of the pigments can have the same color shift with different luminescence effects. This approach provides the ability to create unique luminescent signatures by mixing color-shifting pigments. For example, one could mix 60% of a non-luminescent pigment, 30% of a luminescent pigment type A, and 10% of a luminescent pigment type B, with the resulting admixture having a characteristic luminescent signature that was the average of 30% A and 10% B while still having the desired overt color-shifting performance. To obtain a new luminescent signature, one could simply vary the ratio of type A to type B rather than synthesize new pigments.

The luminescent color-shifting flakes of the present invention are particularly suited for use in applications where colorants of high chroma and durability are desired. By using the luminescent color-shifting flakes in a colorant material, high chroma durable paint or ink can be produced in which variable color effects are noticeable to the human eye. The luminescent color-shifting flakes of the invention have a wide range of color-shifting properties, including large shifts in chroma (degree of color purity) and also large shifts in hue (relative color) with a varying angle of view. Thus, an object colored with a paint containing the luminescent color-shifting flakes of the invention will change color depending upon variations in the viewing angle or the angle of the object relative to the viewing eye.

The luminescent color-shifting flakes of the invention can be easily and economically utilized in paints and inks which can be applied to various objects or papers, such as motorized vehicles, currency and security documents, household appliances, architectural structures, flooring, fabrics, sporting goods, electronic packaging/housing, product packaging, etc. The luminescent color-shifting flakes can also be utilized in forming colored plastic materials, coating materials, extrusions, electrostatic coatings, glass, and ceramic materials.

Generally, the color-shifting foils of the invention have a nonsymmetrical thin film coating structure, which can correspond to the layer structures on one side of a core layer in any of the above described embodiments related to thin film stack flakes. For example, a foil can be formed with repeating dielectric/absorber periods on one side of a reflector layer such as shown for the flake in FIG. 5. The foils can be laminated to various objects or can be formed on a carrier substrate.

Figure 8:
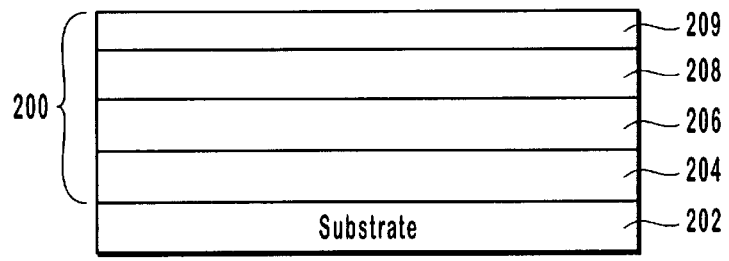
FIG. 8 is a schematic representation of another luminescent color-shifting structure according to the invention.

FIG. 8 depicts a coating structure of a luminescent color-shifting foil 200 formed on a substrate 202, which can be any suitable material such as a flexible PET web, carrier substrate, or other plastic material. A suitable thickness for substrate 202 is, for example, about 0.5 to about 7 mils. The foil 200 includes a reflector layer 204 on substrate 202, a dielectric layer 206 on reflector layer 204, an absorber layer 208 on dielectric layer 206, and a luminescent coating layer 209 on absorber layer 208. The reflector, dielectric, absorber, and luminescent layers can be composed of the same materials and can have the same thicknesses as described above for the corresponding layers in flake 20.

The foil 200 can be formed by a web coating process, with the reflector, dielectric, and absorber layers sequentially deposited on a web by conventional deposition techniques to form a thin film foil structure. The luminescent coating layer can be formed by the methods described above with respect to coating layer 28 of flake 20. The foil 200 can be formed on a release layer (not shown) of a web so that the foil can be subsequently removed and attached to a surface of an object. The foil 200 can also be formed on a carrier substrate, which can be a web without a release layer.

Figure 9:
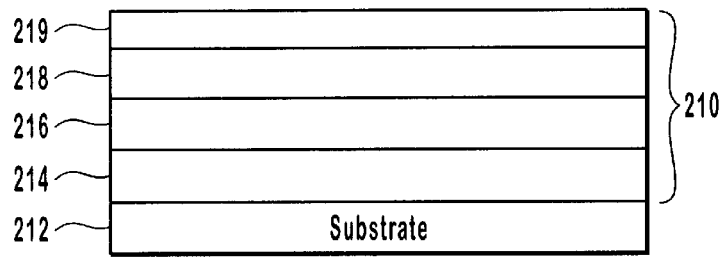
FIG. 9 is a schematic representation of yet another luminescent color-shifting structure according to the invention.

FIG. 9 depicts a coating structure of a color-shifting foil 210 formed on a carrier substrate 212. The foil 210 includes a first absorber layer 214 on substrate 212, a dielectric layer 216 on first absorber layer 214, a second absorber layer 218 on dielectric layer 216, and a luminescent coating layer 219 on absorber layer 218, but does not include a reflector layer. Such a film structure allows the foil to be transparent to light incident upon the surface thereof, thereby providing for visual verification or machine readability of information below the foil 210 on carrier substrate 212. The dielectric, absorber, and luminescent layers of foil 210 can be composed of the same materials and can have the same thicknesses as described above for the corresponding layers in flake 20.

The foils of the invention can be used in a hot stamping configuration where the thin film stack of the foil is removed from the release layer of a substrate by use of a heat activated adhesive. The adhesive can be either coated on a surface of the foil opposite from the substrate, or can be applied in the form of a UV activated adhesive to the surface on which the foil will be affixed. Further details of making and using optical stacks as hot stamping foils can be found in U.S. Pat. Nos. 5,648,165, 5,002,312, 4,930,866, 4,838,648, 4,779,898, and 4,705,300, the disclosures of which are incorporated by reference herein.

Figure 10:
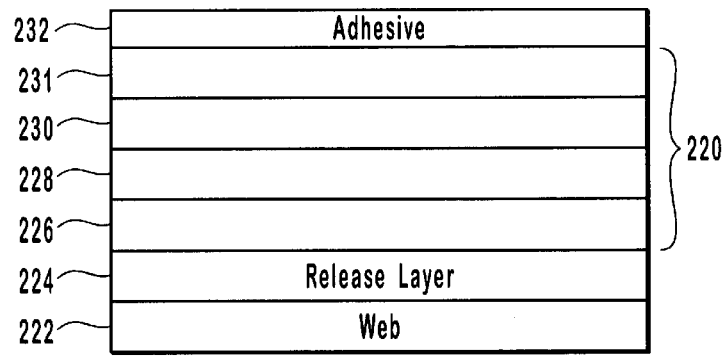
FIG. 10 is a schematic representation of another luminescent color-shifting structure according to the invention.

FIG. 10 illustrates one embodiment of a foil 220 disposed on a web 222 having an optional release layer 224 on which is deposited a reflector layer 226, a dielectric layer 228, an absorber layer 230, and a luminescent coating layer 231. The foil 220 may be utilized attached to the web 222 as a carrier when the release layer is not employed. Alternatively, the foil 220 may be laminated to a transparent substrate (not shown) via an optional adhesive layer 232, such as a transparent adhesive or ultraviolet (UV) curable adhesive, when release layer 224 is used. The adhesive layer 232 can be applied to luminescent coating layer 231 or the transparent substrate.

Figure 11:
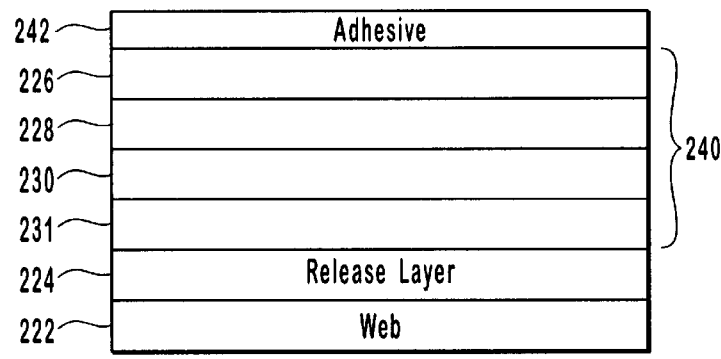
FIG. 11 is a schematic representation of yet another luminescent color-shifting structure according to the invention.

FIG. 11 depicts an alternative embodiment in which a foil 240 having the same thin film layers as foil 220 discussed above is disposed on a web 222 having an optional release layer 224. The foil 240 is formed such that luminescent coating layer 231 is adjacent to web 222. The foil 240 may be utilized attached to web 222 as a carrier, which is preferably transparent, when the release layer is not employed. The foil 240 may also be attached to a substrate (not shown) when release layer 224 is used, via an adhesive layer 242 such as a hot stampable adhesive, a pressure sensitive adhesive, a permanent adhesive, and the like. The adhesive layer 242 is applied to reflector layer 226 or can be applied to the substrate.

The present invention provides numerous advantages and benefits. Primarily, the present invention provides pigment or foil components for security devices which have distinct and pronounced overt and covert features under visible wavelength and non-visible wavelength light sources. These distinct features are not easily duplicated and cannot be copied by simple mixtures of interference pigments and luminescent materials. Another advantage is that the covert features are machine readable, yet coexist with overt features such as the color-shifting nature of the materials. Thus, although it may be apparent that security features exist, it is not apparent how many security features are present. Further, the covert features can selectively code additional information.

The luminescence feature adds to the value of color-shifting pigment products by potentially increasing thermal stability, mechanical stability, and durability. This feature also provides light fastness, as well as solvent and moisture resistance. Additionally, polarization control can be achieved by both the control of luminescent material orientation on the flake surface and the control of flake orientation in a resin or coating composition. The luminescence feature also provides advantages with regard to its spectral rectifying effects, such as angularly dependent luminescence or wavelength selective quenching.

Incorporating luminescent materials onto multilayer flakes also has advantages over mixtures of luminescent particles and color-shifting flakes as to the shape of the luminescent materials. These advantages principally goes to the "lay down" of the flakes. In other words, the geometric positioning of the luminescent material on a flake is flat, allowing for uniform positioning and thus uniform orientation of the luminescent flakes. Also, the inherent shape of the flake can be used to control the morphology of the luminescent layer and thereby provide for new optics.

The following examples are given to illustrate the present invention, and are not intended to limit the scope of the invention.

EXAMPLE 1

Figure 12:
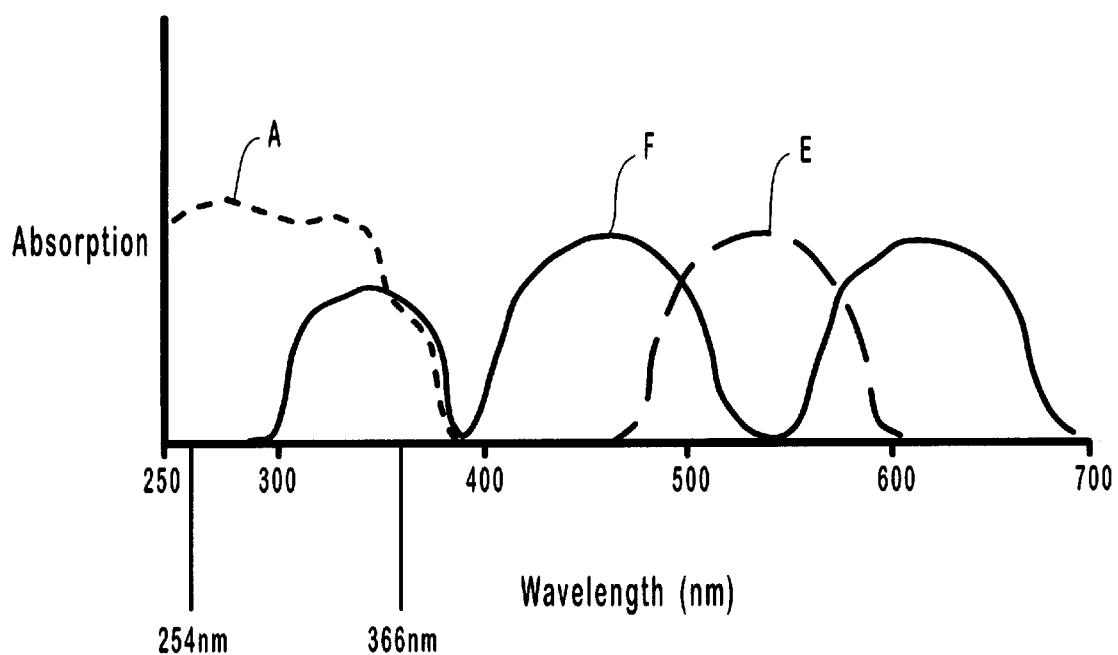
FIG. 12 is a plot demonstrating the effect of tuning the visible and excitation light absorption and reflection properties of a luminescent color-shifting structure of the invention.

FIG. 12 is a plot demonstrating the effect of tuning the visible and excitation light absorption and reflection properties of the luminescent color shifting pigment flakes of the invention, where the absorption and reflectance nodes in the 200–400 nm region have a complimentary effect in the 254 nm and 366 nm regions. The plot of FIG. 12 shows the absorption curve A and the emission curve E for a luminescent dye on the flakes. Curve F shows the absorption/reflectance nodes for the color shifting portion of the flakes. A flake design of this nature allows the primary Hg lamp wavelengths to have different illumination angle effects on the luminescence intensity of the pigment flakes.

EXAMPLE 2

Figure 13:
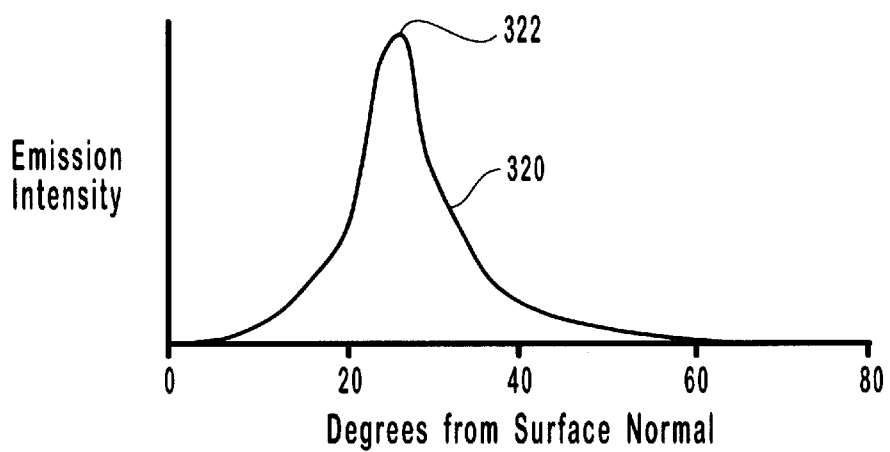
FIG. 13 is a plot demonstrating characteristic angle-sensitive emission of a luminescent color-shifting structure according to the invention.

FIG. 13 is a graph illustrating the angle-sensitive emission 320 of a luminescent color-shifting pigment according to the invention. The graph illustrates how changes in the incident angle of electromagnetic energy results in different emission levels. As shown, there exists a peak 322 of maximum absorption that corresponds to a particular wavelength. Thus, a given luminescent material will highly absorb at one angle of incidence but not at others. This feature of the invention allows for further customization and differentiation of luminescent color-shifting pigments and foils.

EXAMPLE 3

A luminescent color-shifting pigment of the invention was produced by a sol-gel process. A batch of color shifting flakes were over-coated with a layer of silicon dioxide that was sol-gel doped with a luminescent dye. In this approach, the molecules of the luminescent dye covalently bonded to the sol-gel matrix. The sol-gel coating solution had the following components:

3.0 g of 96% ethanol 1.0 g of 99+ tetraethyl-ortho-silicate (TEOS)

0.4 g of 0.1M HCl 0.5 g of a fluorescent dye having the chemical structure shown below and the chemical name of 5-dimethylamino-N-(3-triethoxysilyl-propyl)naphthalene-1-sulfonamide.

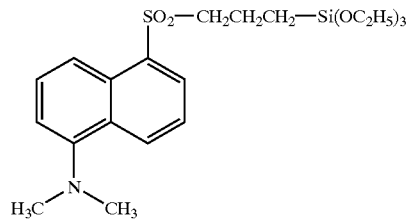

After combining all ingredients the coating solution was kept for 30 minutes at 80° C. under continuous stirring. Then 0.5 g of the color shifting pigment was added to the solution and the mixture was exposed to an additional 30 minutes of stirring at 80° C. After this process step the flakes of the coated pigment were filtered out on a Buchner funnel, rinsed off twice with 10 ml of ethanol and dried under ambient conditions. The dry flakes were then subjected to a thermal treatment. During this step the temperature was increased up to 250° C. at a rate of 5° C./min. After 60 minutes at 250° C. the flakes were slowly cooled down to room temperature and thereby made ready for further applications as a fluorescent optically variable pigment.

EXAMPLE 4

A luminescent color-shifting pigment was produced by a sol-gel process similar to that described in Example 3. The flakes of the pigment had a multilayer structure similar to flake 20 of FIG. 1. The luminescent response of this pigment was measured by using two different illuminating wavelengths. These included a short wavelength excitation having a spectral radiance peaked at 406 nm (short), and a long wavelength excitation having a spectral radiance peaked at 524 nm (long).

Table 1 below summarizes the spectral response (sr) intensity of the pigment in Watt/sr/m$^2$ for each excitation wavelength over the visible spectrum (420–780 nm) in 10 nm increments. Table 1 lists the measured background intensity along with the measured luminescent intensity of the pigment at the short and long wavelengths both before (short, long) and after adjustment for the background intensity (short-bk, long-bk). The adjustment was made by subtracting the measured background intensity from the measured intensity values of the pigment at both the short and long wavelengths.

TABLE 1

| Wavelength (nm) | Background | Short | Long | Wavelength (nm) | Short-Bk | Long-Bk |
|---|---|---|---|---|---|---|
| 420 | 3.21E−01 | 4.01E−01 | 3.89E−01 | 420 | 7.95E−02 | 6.78E−02 |
| 430 | 3.34E−01 | 4.40E−01 | 4.31E−01 | 430 | 1.06E−01 | 9.71E−02 |
| 440 | 3.88E−01 | 5.44E−01 | 5.33E−01 | 440 | 1.56E−01 | 1.45E−01 |
| 450 | 4.50E−01 | 7.15E−01 | 7.23E−01 | 450 | 2.65E−01 | 2.73E−01 |
| 460 | 4.01E−01 | 7.42E−01 | 8.09E−01 | 460 | 3.41E−01 | 4.07E−01 |
| 470 | 3.84E−01 | 8.40E−01 | 9.65E−01 | 470 | 4.56E−01 | 5.80E−01 |
| 480 | 3.96E−01 | 1.05E+00 | 1.24E+00 | 480 | 6.55E−01 | 8.46E−01 |
| 490 | 3.93E−01 | 1.25E+00 | 1.56E+00 | 490 | 8.60E−01 | 1.16E+00 |
| 500 | 3.38E−01 | 1.29E+00 | 1.64E+00 | 500 | 9.51E−01 | 1.30E+00 |
| 510 | 3.23E−01 | 1.45E+00 | 1.90E+00 | 510 | 1.12E+00 | 1.57E+00 |
| 520 | 3.13E−01 | 1.61E+00 | 2.17E+00 | 520 | 1.30E+00 | 1.86E+00 |
| 530 | 2.74E−01 | 1.60E+00 | 2.15E+00 | 530 | 1.32E+00 | 1.88E+00 |

TABLE 1-continued

| Wavelength (nm) | Background | Short | Long | Wavelength (nm) | Short-Bk | Long-Bk |
|---|---|---|---|---|---|---|
| 540 | 2.32E−01 | 1.50E+00 | 2.08E+00 | 540 | 1.27E+00 | 1.85E+00 |
| 550 | 2.02E−01 | 1.44E+00 | 2.02E+00 | 550 | 1.24E+00 | 1.81E+00 |
| 560 | 1.84E−01 | 1.44E+00 | 2.03E+00 | 560 | 1.26E+00 | 1.84E+00 |
| 570 | 1.64E−01 | 1.35E+00 | 1.91E+00 | 570 | 1.19E+00 | 1.74E+00 |
| 580 | 1.25E−01 | 1.10E+00 | 1.57E+00 | 580 | 9.78E−01 | 1.45E+00 |
| 590 | 9.89E−02 | 9.17E−01 | 1.34E+00 | 590 | 8.18E−01 | 1.24E+00 |
| 600 | 8.90E−02 | 8.42E−01 | 1.23E+00 | 600 | 7.52E−01 | 1.14E+00 |
| 610 | 7.52E−02 | 7.37E−01 | 1.07E+00 | 610 | 6.62E−01 | 9.98E−01 |
| 620 | 6.26E−02 | 5.83E−01 | 8.47E−01 | 620 | 5.21E−01 | 7.84E−01 |
| 630 | 4.93E−02 | 4.51E−01 | 6.79E−01 | 630 | 4.01E−01 | 6.29E−01 |
| 640 | 4.16E−02 | 3.50E−01 | 5.27E−01 | 640 | 3.09E−01 | 4.85E−01 |
| 650 | 3.55E−02 | 2.77E−01 | 4.05E−01 | 650 | 2.42E−01 | 3.70E−01 |
| 660 | 2.93E−02 | 2.21E−01 | 3.26E−01 | 660 | 1.91E−01 | 2.97E−01 |
| 670 | 2.89E−02 | 1.85E−01 | 2.84E−01 | 670 | 1.56E−01 | 2.55E−G1 |
| 680 | 2.48E−02 | 1.43E−01 | 2.28E−01 | 680 | 1.18E−01 | 2.04E−01 |
| 690 | 1.72E−02 | 9.57E−02 | 1.34E−01 | 690 | 7.85E−02 | 1.17E−01 |
| 700 | 1.48E−02 | 6.99E−02 | 1.10E−01 | 700 | 5.52E−02 | 9.50E−02 |
| 710 | 1.19E−02 | 5.62E−02 | 7.88E−02 | 710 | 4.43E−02 | 6.69E−02 |
| 720 | 1.26E−02 | 4.51E−02 | 6.88E−02 | 720 | 3.25E−02 | 5.62E−02 |
| 730 | 1.15E−02 | 3.73E−02 | 5.50E−02 | 730 | 2.58E−02 | 4.35E−02 |
| 740 | 1.55E−02 | 3.73E−02 | 4.24E−02 | 740 | 2.18E−02 | 2.69E−02 |
| 750 | 1.22E−01 | 1.63E−01 | 1.22E−01 | 750 | 4.11E−02 | 8.00E−04 |
| 760 | 1.08E−01 | 1.52E−01 | 1.02E−01 | 760 | 4.40E−02 | −6.10E−03 |
| 770 | 1.19E−01 | 1.74E−01 | 1.06E−01 | 770 | 5.49E−02 | −1.30E−02 |
| 780 | 3.38E−02 | 5.11E−02 | 7.68E−02 | 780 | 1.73E−02 | 4.31E−02 |

Figure 14:
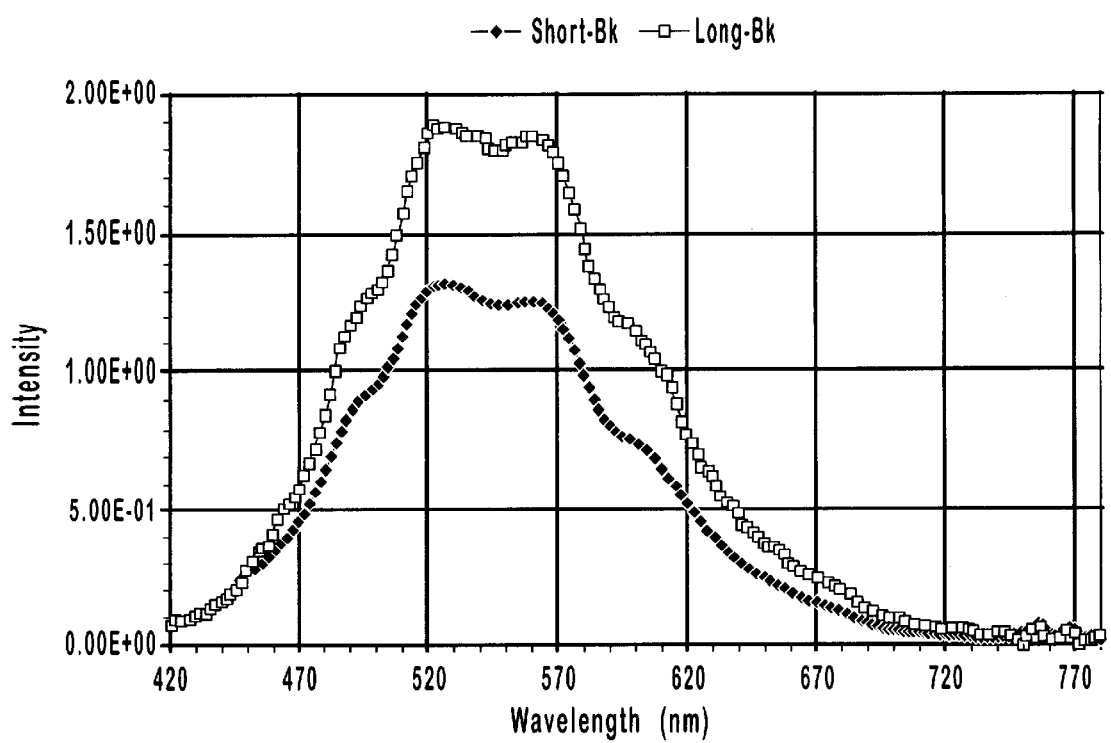
FIG. 14 is a plot of the luminescent response of a color-shifting pigment according to the invention.

FIG. 14 is a graph that plots the luminescent response of the pigment by use of the data points in Table 1 which were adjusted to eliminate the background intensity. As shown in the graph of FIG. 14, the luminescent intensity varied with excitation wavelength. The pigment also simultaneously exhibited highly chromatic color-shifting properties.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A luminescent color-shifting pigment flake, comprising:
    a reflector layer;
    a first dielectric layer overlying the reflector layer;
    a first absorber layer overlying the first dielectric layer; and
    a luminescent coating layer overlying the first absorber layer;
wherein the pigment flake exhibits a discrete color shift such that the pigment flake has a first color at a first angle of incident light or viewing and a second color different from the first color at a second angle of incident light or viewing.

2. The pigment flake of claim 1, further comprising a second dielectric layer overlying the reflector layer on a side opposite from the first dielectric layer.

3. The pigment flake of claim 2, further comprising a second absorber layer overlying the second dielectric layer opposite from the first absorber layer, the second absorber layer having a physical thickness of about 30 Å to about 300 Å.

4. The pigment flake of claim 1, wherein the dielectric layer substantially surrounds the reflector layer, and the absorber layer substantially surrounds the dielectric layer.

5. The pigment flake of claim 2, wherein the absorber layer substantially surrounds the first and second dielectric layers and the reflector layer.

6. The pigment flake of claim 1, wherein the luminescent coating layer substantially surrounds the absorber layer, the dielectric layer, and the reflector layer.

7. The pigment flake of claim 3, wherein the luminescent coating layer substantially surrounds the first and second absorber layers, the first and second dielectric layers, and the reflector layer.

8. The pigment flake of claim 4, wherein the luminescent coating layer substantially surrounds the absorber layer.

9. The pigment flake of claim 5, wherein the luminescent coating layer substantially surrounds the absorber layer.

10. The pigment flake of claim 1, wherein the reflector layer comprises a reflective material selected from the group consisting of aluminum, silver, copper, gold, platinum, tin, titanium, palladium, nickel, cobalt, rhodium, niobium, chromium, and combinations or alloys thereof.

11. The pigment flake of claim 1, wherein the reflector layer has a physical thickness of about 200 Å to about 10,000 Å.

12. The pigment flake of claim 1, wherein the reflector layer comprises a core flake section including a reflector sublayer having a top surface, a bottom surface, and at least one side surface, and a support sublayer preformed on at least one of the top and bottom surfaces but not on the at least one side surface of the reflector sublayer.

13. The pigment flake of claim 1, wherein the reflector layer comprises a composite reflective flake including a central support sublayer having a top surface, a bottom surface, and at least one side surface, and a reflector sublayer preformed on each of the top and bottom surfaces but not on the at least one side surface of the support sublayer.

14. The pigment flake of claim 2, wherein the first and second dielectric layers comprise a dielectric material having an index of refraction of about 1.65 or less.

15. The pigment flake of claim 14, wherein the dielectric material is selected from the group consisting of silicon dioxide, aluminum oxide, magnesium fluoride, aluminum fluoride, cerium fluoride, lanthanum fluoride, neodymium fluoride, samarium fluoride, barium fluoride, calcium fluoride, lithium fluoride, and combinations thereof.

16. The pigment flake of claim 2, wherein the first and second dielectric layers comprise a dielectric material having an index of refraction of greater than about 1.65.

17. The pigment flake of claim 16, wherein the dielectric material is selected from the group consisting of zinc sulfide, zinc oxide, zirconium oxide, titanium dioxide, carbon, indium oxide, indium-tin-oxide, tantalum pentoxide, cerium oxide, yttrium oxide, europium oxide, iron oxides, hafnium nitride, hafnium carbide, hafnium oxide, lanthanum oxide, magnesium oxide, neodymium oxide, praseodymium oxide, samarium oxide, antimony trioxide, silicon carbide, silicon nitride, silicon monoxide, selenium trioxide, tin oxide, tungsten trioxide, and combinations thereof.

18. The pigment flake of claim 2, wherein the first and second dielectric layers have an optical thickness in a range from about 2 QWOT at a design wavelength of about 400 nm to about 9 QWOT at a design wavelength of about 700 nm.

19. The pigment flake of claim 2, wherein the first and second dielectric layers have the same optical thickness.

20. The pigment flake of claim 2, wherein the first and second dielectric layers are composed of the same material.

21. The pigment flake of claim 2, wherein the first and second dielectric layers are each composed of a dielectric optical stack having a plurality of alternating layers of a high index material and a low index material.

22. The pigment flake of claim 21 wherein the dielectric optical stack has a gradient index of refraction.

23. The pigment flake of claim 2, wherein the first and second dielectric layers are each composed of a mixture or multiple sublayers of dielectric materials selected from the group consisting of low index materials, high index materials, and combinations thereof.

24. The pigment flake of claim 3, wherein the first and second absorber layers comprise an absorbing material selected from the group consisting of chromium, nickel, aluminum, palladium, platinum, titanium, vanadium, cobalt, iron, tin, tungsten, molybdenum, rhodium, niobium, carbon, graphite, silicon, germanium, and compounds, mixtures, or alloys thereof.

25. The pigment flake of claim 3, wherein the first and second absorber layers comprise a material selected from the group consisting of elemental titanium, titanium-based compounds, titanium-based alloys, and combinations thereof.

26. The pigment flake of claim 3, wherein the first absorber layer has a physical thickness of about 30 Å to about 300 Å.

27. The pigment flake of claim 3, wherein the first and second absorber layers have the same physical thickness.

28. The pigment flake of claim 3, wherein the first and second absorber layers are composed of the same material.

29. The pigment flake of claim 1, wherein the luminescent coating layer comprises one or more luminescent materials that are excited by one or more energy sources selected from the group consisting of infrared radiation, ultraviolet radiation, visible light, electric fields, magnetic fields, and chemical reaction.

30. The pigment flake of claim 1, wherein the luminescent coating layer comprises a luminescent material that exhibits fluorescence or phosphorescence.

31. The pigment flake of claim 1, wherein the luminescent coating layer comprises a fluorescent dye combined with a liquid crystal polymer.

32. The pigment flake of claim 1, wherein the luminescent coating layer comprises a crystalline phosphor material.

33. The pigment flake of claim 1, wherein the luminescent coating layer comprises a luminescent material composed of solid phase or water-soluble quantum dot particles.

34. The pigment flake of claim 1, wherein the luminescent coating layer has a physical thickness of about 50 Å to about 20,000 Å.

35. The pigment flake of claim 1, wherein the pigment flake exhibits a luminescence intensity that is dependent upon the angle at which incident light at excitation wavelengths enters the pigment flake.

36. A luminescent color-shifting pigment material comprising a plurality of color-shifting pigment flakes, the pigment flakes having a multilayer structure as defined in claim 1.

37. A luminescent color-shifting colorant composition, comprising:
 a pigment medium; and
 a plurality of luminescent color-shifting pigment flakes dispersed in the pigment medium, the pigment flakes having a multilayer structure as defined in claim 1.

38. The colorant composition of claim 37, wherein the pigment medium comprises a material selected from the group consisting of acrylic melamine, urethanes, polyesters, vinyl resins, acrylates, methyl methacrylate, ABS resins, epoxies, styrenes, ink and paint formulations based on alkyd resins, and mixtures thereof.

39. The colorant composition of claim 37, wherein the pigment flakes have a dimension on any surface thereof ranging from about 2 microns to about 200 microns.

40. The colorant composition of claim 37, further comprising a plurality of non-luminescent color-shifting pigment flakes dispersed in the pigment medium.

41. The colorant composition of claim 40, wherein the non-luminescent color-shifting pigment flakes and the luminescent color-shifting pigment flakes are combined in a mixture comprising at least about 1 wt-% luminescent color-shifting pigment flakes prior to being dispersed in the pigment medium.

42. The colorant composition of claim 40, wherein the plurality of luminescent color-shifting pigment flakes include two or more luminescent flake types having the same color shift and combined in a predetermined ratio to produce a selected luminescent signature for the colorant composition.

43. A luminescent color-shifting pigment flake, comprising:
 a multilayer core comprising:
  a first absorber layer;
  a first dielectric layer overlying the first absorber layer;
  a reflector layer overlying the first dielectric layer;
  a second dielectric layer overlying the reflector layer; and
  a second absorber layer overlying the second dielectric layer; and
 a luminescent coating layer substantially surrounding the multilayer core;
wherein the pigment flake exhibits a discrete color shift such that the pigment flake has a first color at a first angle of incident light or viewing and a second color different from the first color at a second angle of incident light or viewing.

44. The pigment flake of claim 43, wherein the multilayer core further comprises a third dielectric layer overlying the second absorber layer, and a fourth dielectric layer overlying the first absorber layer.

45. The pigment flake of claim 43, wherein the third and fourth dielectric layers form a continuous coating layer around the layers interior thereto.

46. The pigment flake of claim 43, wherein the multilayer core further comprises a third absorber layer overlying the third dielectric layer, and a fourth absorber layer overlying the fourth dielectric layer.

47. The pigment flake of claim 46, wherein the third and fourth absorber layers form a continuous coating layer around the layers interior thereto.

48. The pigment flake of claim 43, wherein the pigment flake exhibits a luminescence intensity that is dependent upon the angle at which incident light at excitation wavelengths enters the pigment flake.

49. A luminescent color-shifting pigment flake, comprising:
- a core layer;
- a dielectric layer substantially surrounding the core layer;
- an absorber layer substantially surrounding the dielectric layer; and
- a luminescent coating layer substantially surrounding the absorber layer;

wherein the pigment flake exhibits a discrete color shift such that the pigment flake has a first color at a first angle of incident light or viewing and a second color different from the first color at a second angle of incident light or viewing.

50. The pigment flake of claim 49, further comprising at least one additional dielectric layer and at least one additional absorber layer which substantially surround the absorber layer but are encapsulated by the luminescent coating layer.

51. The pigment flake of claim 49, wherein the pigment flake exhibits a luminescence intensity that is dependent upon the angle at which incident light at excitation wavelengths enters the pigment flake.

52. A luminescent color-shifting pigment flake, comprising:
- a core reflector layer having a top surface, a bottom surface, and at least one side surface;
- a dielectric layer overlying the top surface and the bottom surface but not on at least one side surface of the reflector layer;
- an absorber layer substantially surrounding the dielectric layer and in contact with at least one side surface of the reflector layer; and
- a luminescent coating layer substantially surrounding the absorber layer;

wherein the pigment flake exhibits a discrete color shift such that the pigment flake has a first color at a first angle of incident light or viewing and a second color different from the first color at a second angle of incident light or viewing.

53. The pigment flake of claim 52, wherein the pigment flake exhibits a luminescence intensity that is dependent upon the angle at which incident light at excitation wavelengths enters the pigment flake.

54. A luminescent color-shifting pigment flake, comprising:
- a core layer;
- a reflector coating substantially surrounding the core layer;
- a dielectric layer substantially surrounding the reflector coating;
- an absorber layer substantially surrounding the dielectric layer; and
- a luminescent coating layer substantially surrounding the absorber layer;

wherein the pigment flake exhibits a discrete color shift such that the pigment flake has a first color at a first angle of incident light or viewing and a second color different from the first color at a second angle of incident light or viewing.

55. The pigment flake of claim 54, wherein the core layer comprises a material selected from the group consisting of mica, glass, talc, iron oxide, and boron nitride.

56. The pigment flake of claim 54, wherein the pigment flake exhibits a luminescence intensity that is dependent upon the angle at which incident light at excitation wavelengths enters the pigment flake.

57. A luminescent color-shifting pigment flake, comprising:
- a core layer;
- a first absorber layer substantially surrounding the core layer;
- a dielectric layer substantially surrounding the first absorber layer;
- a second absorber layer substantially surrounding the dielectric layer; and
- a luminescent coating layer substantially surrounding the second absorber layer;

wherein the pigment flake exhibits a discrete color shift such that the pigment flake has a first color at a first angle of incident light or viewing and a second color different from the first color at a second angle of incident light or viewing.

58. The pigment flake of claim 57, wherein the core layer is composed of mica or glass.

59. The pigment flake of claim 57, wherein the dielectric layer is composed of silicon dioxide or titanium dioxide.

60. The pigment flake of claim 59, wherein the dielectric layer is formed by a sol-gel process.

61. The pigment flake of claim 57, wherein the pigment flake exhibits a luminescence intensity that is dependent upon the angle at which incident light at excitation wavelengths enters the pigment flake.

62. A luminescent color-shifting pigment flake, comprising:
- a first absorber layer;
- a dielectric layer overlying the first absorber layer;
- a second absorber layer overlying the dielectric layer; and
- a luminescent coating layer substantially surrounding the first and second absorber layers and the dielectric layer;

wherein the pigment flake exhibits a discrete color shift such that the pigment flake has a first color at a first angle of incident light or viewing and a second color different from the first color at a second angle of incident light or viewing.

63. The pigment flake of claim 62, wherein the pigment flake exhibits a luminescence intensity that is dependent upon the angle at which incident light at excitation wavelengths enters the pigment flake.

64. The pigment flake of claim 62, wherein the first and second absorber layers form a continuous coating layer that encapsulates the dielectric layer.

65. A luminescent color-shifting foil, comprising:
- a reflector layer;
- a dielectric layer overlying the reflector layer;
- an absorber layer overlying the dielectric layer; and
- a luminescent coating layer overlying the absorber layer;

wherein the foil exhibits a discrete color shift such that the foil has a first color at a first angle of incident light or viewing and a second color different from the first color at a second angle of incident light or viewing.

66. The foil of claim 65, further comprising an adhesive layer for laminating the foil to a substrate.

67. The foil of claim 66, wherein the adhesive layer is selected from the group consisting of a hot stampable adhesive, a pressure sensitive adhesive, a permanent adhesive, a transparent adhesive, and a UV curable adhesive.

68. The foil of claim 65, wherein the luminescent coating layer comprises one or more luminescent materials that are excited by one or more energy sources selected from the group consisting of infrared radiation, ultraviolet radiation, visible light, electric fields, magnetic fields, and chemical reaction.

69. The foil of claim 65, wherein the luminescent coating layer comprises a luminescent material that exhibits fluorescence or phosphorescence.

70. The foil of claim 65, wherein the luminescent coating layer comprises a luminescent material composed of solid phase or water-soluble quantum dot particles.

71. The foil of claim 65, wherein the foil exhibits a luminescence intensity that is dependent upon the angle at which incident light at excitation wavelengths enters the foil.

72. A luminescent color-shifting foil device, comprising:
 a carrier substrate;
 a first absorber layer overlying the carrier substrate;
 a dielectric layer overlying the first absorber layer;
 a second absorber layer overlying the dielectric layer; and
 a luminescent coating layer overlying the second absorber layer;
wherein the foil exhibits a discrete color shift such that the foil has a first color at a first angle of incident light or viewing and a second color different from the first color at a second angle of incident light or viewing.

73. A luminescent optical effect pigment composition, comprising:
 a plurality of optical effect pigment flakes having a first surface and a second surface opposite the first surface; and
 a luminescent coating layer overlying at least one of the first or second surfaces of the pigment flakes.

74. The pigment composition of claim 73, wherein the luminescent coating layer substantially surrounds the optical effect pigment flakes.

75. The pigment composition of claim 73, wherein the optical effect pigment flakes are selected from the group consisting of multilayer optical interference pigments, solid pigments comprising one or more solidified polymeric liquid crystal components, microdiffractive pigments, interference mica, and coated interference mica.

76. The pigment composition of claim 74, wherein the optical effect pigment flakes are selected from the group consisting of multilayer optical interference pigments, solid pigments comprising one or more solidified polymeric liquid crystal components, microdiffractive pigments, interference mica, and coated interference mica.

77. A luminescent color-shifting pigment flake, comprising:
 an optically variable layer having a first surface and a second surface opposite the first surface, the optically variable layer comprising one or more solidified polymeric liquid crystal components; and
 a luminescent coating layer overlying at least one of the first or second surfaces of the optically variable layer.

78. The pigment flake of claim 77, wherein the luminescent coating layer substantially surrounds the optically variable layer.

79. A method of fabricating a luminescent color-shifting pigment flake material, comprising:
 providing a plurality of non-luminescent color-shifting pigment flakes;
 encapsulating the color-shifting pigment flakes with a luminescent coating layer to produce a plurality of luminescent color-shifting flakes that exhibit a discrete color shift such that the material has a first color at a first angle of incident light or viewing and a second color different from the first color at a second angle of incident light or viewing.

80. The method of claim 79, wherein the luminescent coating layer comprises one or more luminescent materials that are excited by one or more energy sources selected from the group consisting of infrared radiation, ultraviolet radiation, visible light, electric fields, magnetic fields, and chemical reaction.

81. The method of claim 79, wherein the luminescent coating layer comprises a luminescent material that exhibits fluorescence or phosphorescence.

82. The method of claim 79, wherein the luminescent coating layer comprises a luminescent material composed of solid phase or water-soluble quantum dot particles.

83. The method of claim 79, wherein the pigment flakes are encapsulated by a process comprising:
 dissolving a luminescent material in a sol-gel solution;
 immersing the pigment flakes in the sol-gel solution to form coated pigment flakes; and
 separating the coated pigment flakes from the sol-gel solution.

84. The method of claim 79, wherein the pigment flakes are encapsulated by a process comprising:
 forming porous nanospheres from a sol-gel solution;
 imbibing the nanospheres with a luminescent material to produce luminescent nanospheres;
 immersing the pigment flakes in the sol-gel solution to form coated pigment flakes encapsulated with the luminescent nanospheres; and
 separating the coated pigment flakes from the sol-gel solution.

* * * * *